United States Patent [19]
Horiuchi et al.

[11] Patent Number: 5,388,056
[45] Date of Patent: Feb. 7, 1995

[54] METHOD AND SYSTEM FOR VIBRATION TEST

[75] Inventors: Toshihiko Horiuchi, Ushiku; Masaki Nakagawa, Ibaraki; Masatsugu Kametani, Tsuchiura, all of Japan

[73] Assignee: Hitachi, Ltd., Tokyo, Japan

[21] Appl. No.: 908,167

[22] Filed: Jul. 2, 1992

[30] Foreign Application Priority Data

Jul. 2, 1991 [JP] Japan .................. 3-161379

[51] Int. Cl.⁶ ............................. G01H 1/04
[52] U.S. Cl. .................. 364/508; 364/150; 73/664
[58] Field of Search .......... 73/663, 667, 669, 772, 73/774, 781, 784, 804, 664; 364/508, 421, 512, 150; 52/1

[56] References Cited

U.S. PATENT DOCUMENTS

| | | | |
|---|---|---|---|
| 3,710,082 | 1/1973 | Sloane et al. | 364/508 |
| 4,297,888 | 11/1981 | Hirai et al. | 73/664 |
| 4,516,206 | 5/1985 | McEvilly | 364/421 |
| 4,858,146 | 8/1989 | Shebini | 364/512 |
| 5,065,552 | 11/1991 | Kobori et al. | 52/1 |

FOREIGN PATENT DOCUMENTS

60-13240  1/1985  Japan .
61-34438  2/1986  Japan .

OTHER PUBLICATIONS

Clough, Ray W. "Dynamics of Structures," McGraw-Hill Kogakusha, Ltd., 1982, pp. 575-578.
Takahashi, K. "Japanese Activity on On-Line Testing," *Journal of Engineering Mechanics* ASCE, vol. 113, Nov. 7, 1987, pp. 1014-1028.

*Primary Examiner*—Emanuel T. Voeltz
*Assistant Examiner*—Thomas Peeso
*Attorney, Agent, or Firm*—Antonelli, Terry, Stout & Kraus

[57] ABSTRACT

A vibration testing system is economical and has high precision in realizing an equivalent test condition for testing for an entire structure, by employing a partial model by coupling testing of a partial structure and analysis of a numerical model with respect to a large structure or a structure having a portion that is difficult to establish the numerical model. In the vibration test using an actuator, a reaction of the member of the structure is detected to derive a vibration response after a given period of time at a boundary between the numerical model and the member. Excitation is performed so that the response of the actuator after the given period becomes consistent with a calculated value to make it possible to apply the response calculated with respect to the numerical model to the member by the actuator at the same timing to the actually occurring timing.

28 Claims, 15 Drawing Sheets

20: VIBRATION RESPONSE CALCULATION FOR NEXT STEP
21: DRIVING OF ACTUATOR
22: MEASUREMENT OF REACTION

- 20 : VIBRATION RESPONSE CALCULATION FOR NEXT STEP
- 21 : DRIVING OF ACTUATOR
- 22 : MEASUREMENT OF REACTION

METHOD AND SYSTEM FOR VIBRATION TEST

BACKGROUND OF THE INVENTION

The present invention relates to a method and system for conducting a shaking or vibration test for a structure. More specifically, the invention relates to a method and a system for conducting a vibration test which is particularly suitable for an object structure that is of such substantial size thereby rendering an excitation test for the whole structure difficult to perform. Also, the invention relates to a vibration response analyzing system suitable for analyzing vibration response of a structure including structures that are difficult to tested.

Clough, Ray W. "Dynamics of Structures", McGraw-Hill Kogakusha, Ltd., 1982, pp 575-578 describes excitation of a structure and equations of motion.

U.S. Pat. No. 4,953,074, entitled "Function-Distributed Control Apparatus", issued to Kametani et al., on Aug. 28, 1990 discloses a control apparatus for controlling automated machinery.

JP-A-60-13240 and JP-A-61-34438 disclose, respectively, a method for a response analysis and a vibration test with respect to a numeric model and a member.

K. Takahashi, "Japanese Activity on On-Line Testing" J. of Engineering Mechanics ASCE, Vol. 113, No. 7, 1987, pp 1014-1028, discloses analysis of the earthquake response by way of an on-line computer test.

Conventionally, evaluation of an earthquake or vibration response of a structure is performed by exciting the structure on a shaking table. However, when the structure significantly large, it is sometimes difficult to mount the actual structure on the shaking table due to capacity limitations of the shaking table. In such a case, evaluation of the earthquake response or vibration response is performed by performing an excitation test for a reduced structure which can be mounted on the shaking table, performing an excitation test only for the part of the structure, or performing an excitation test for a reduced part of the structure.

However, the former method has difficulty securely satisfying a law of similarity upon establishing the reduced structure, or so forth. On the other hand, in the latter method, there is difficulty or even an impossibility of producing highly precise excitation since the exciting vibration applied to the object structure of excitation is per se associated with the response of the structure to be excited, which makes it difficult to achieve accurate evaluation of the earthquake or vibration response.

In view of these problems, there is another approach for establishing a vibration testing method, in which only a part of the structure, i.e. a member, is excited and remaining members are established as a numerical model, a vibration response at a boundary is calculated by means of a digital computer, the member as the numerical model is excited and further evaluation of the numerical model is performed using a reaction at the boundary.

The vibration testing methods, in which the part of the structure, member or the reduced structure is excited and calculation of response for other parts is performed by means of the digital computer with establishing the numerical model for those parts, have been disclosed in the above-identified references JP-A-60-13240 and JP-A-61-34438.

It should be noted that conventional vibration response analyzing system for the structure performs calculation by establishing the numerical model of the overall structure as the object for evaluation of the vibration response, by way of a finite element method, for example.

In the method disclosed in JP-A-60-13240 and JP-A-61-34438, a displacement is provided by means of an actuator expanding a time axis. Therefore, it is possible to accurately measure the reaction only depending upon the displacement, and cannot evaluate reaction depending upon a velocity, such as viscosity damping force. Furthermore, since the time axis is expanded, it requires several hours for evaluation of a phenomenon corresponding to an earthquake response in the order of several tens of seconds.

In addition, in the latter publication, the reaction depending upon an acceleration is evaluated by providing an actuator applying a load corresponding to an inertia force. However, since the load by the actuator is applied at a single point, it becomes inaccurate for a distributed load which cannot be modeled into concentrated mass system.

The applicant has made an attempt to perform vibration test method in real time with respect to an equipment to be stationarily installed, in order to solve the problems as set forth above. Through the attempt, it has been found that it is difficult to apply the attempted method for the evaluation of stress due to relative displacements or so forth at a plurality of points, since the object to be excited is oscillated or vibrated on the shaking table.

Furthermore, means for effectively processing calculated values and measure values have not been considered in the prior art.

SUMMARY OF THE INVENTION

It is an object of the present invention to provide a vibration testing system for a structure, which can accurately evaluate earthquake or vibration response of a large structure by exciting only a portion of the structure, a particular structure element or member of the structure, and can perform the test in a short period of time.

Another object of the invention is to provide a method and a system for a vibration test, which is suitable for effectively performing vibration test employing the above-mentioned vibration testing system.

In the conventional vibration response evaluation system, it is difficult to determine all parameters associated with vibration response upon building the object structure, and this problem can significantly differentiate the calculated vibration response to the actual vibration response in the case where modeling is difficult.

Therefore, a further object of the present invention is to provide a vibration response analyzing system which can accurately evaluate the vibration response even for a structure which is difficult to be modeled.

A still further object of the present invention is to provide a vibration testing system which permits calculation of the vibration response using a reaction obtained by setting a time axis of the result of arithmetic operation and a time axis of the vibration test consistent with each other.

(a) In order to permit accurate evaluation of a vibration response by an excitation test for a structure member, one or more actuators having devices for measuring reaction on the actuators from the member, is provided at a boundary or boundaries between the member and the numerical model. In a digital computer having means for inputting a measured value of the reaction measuring device and means for outputting a control signal to a controller for the actuator, the measured value of the reaction measuring device is input with a given interval by the inputting means, calculation of the vibration response after given period of time of measuring the reaction at the boundary of the numerical model is performed using the measured value of the reaction and a known external force, and an excitation signal derived from the result of calculation of the vibration response to the controller for the actuator to realize the vibration response of the result of calculation for the vibration response by the actuator. A time axis of calculation in the digital computer for the boundary between the numerical model and the member is set to be consistent with a time axis of vibration response realized by the actuator.

On the other hand, accurate evaluation of the vibration response by an excitation test for the structure member can be achieved by calculating the vibration response after a given period of time of measuring the reaction at the boundary of the numerical model and the member, and repeating to make the vibration response of the actuator after the given period consistent with the calculated value.

(b) Application of the above-mentioned testing system and method in a wide variety of structures is achieved by selecting any of a displacement, displacement and a velocity, displacement and an acceleration, or the displacement, the velocity and the acceleration as the vibration response realized by the actuator, depending upon the characteristics of the member and the coupling condition of the member and the numerical model, in order to accurately evaluate the reaction.

(c) Realization of the calculated value of the highly precise vibration response can be achieved by controlling the actuator by displacement control, and by establishing the displacement response of the actuator between the timings to realize the calculated value in a time configuration depending upon the type of vibration response to be realized by the actuator. Also, it can be achieved by inputting the control signal depending upon the characteristics of the actuator to the controller for the actuator.

(d) Realization of the calculated value of the displacement by the actuator with high precision can be achieved by measuring the actual displacements when the displacement is to be realized, and by correcting an error of the actually measured value and the calculated value with a time function configuration which does not influence other vibration responses to be realized.

(e) Establishing the necessary time function configuration of displacement response in a time interval between the timings to realize the calculated value is achieved by dividing the time interval into a plurality of intervals, calculating the control signal for the actuator at respective dividing points by the digital computer and providing them to the controller for the actuator.

(f) Effective calculation of the control signal for the actuator at respective dividing points in the digital computer can be achieved by performing calculation of the vibration response of the numerical model and calculation of the control signal for the actuator at the dividing points in parallel.

(g) Parallel calculation of the vibration response of the numerical model and the control signal for the actuator at the dividing points can be effectively achieved by providing at least two CPUs in the digital computer, performing calculation of the vibration response of the numerical model with at least one of the CPUs, performing calculation of the control signal for the actuator at the dividing points by at least one of CPUs different from that performing vibration response calculation. On the other hand, by enabling reference for a common memory for the CPUs performing the foregoing two functions, high speed transfer of the calculated value can be permitted so as to perform the calculation of the control signal for the actuator at high speed.

(h) Application of the present invention for a relatively large member can be achieved by providing a shaking table as one of the actuators.

(i) Effective evaluation of the results of the vibration test with the vibration testing method and system according to the present invention, can be achieved by outputting the calculated value of the vibration response in a form of voltage or so forth during the vibration test. On the other hand, it is also achieved by storing the calculated value of the vibration response of the numerical model and the measured value of the vibration response in the member in a memory of the digital computer, and outputting the data after completion of the test.

(j) High precision analysis of the vibration response of the structure which is difficult to be modeled can be achieved by taking the portion of the structure which is difficult to be modeled as the member to be tested, exciting the member by the actuator based on the result of analysis of the vibration response for the numerical model, and performing analysis of coupled vibration of the member and the numerical model using the result of measurement of the reaction.

(k) The foregoing can be achieved with the technology set out in the appended claims.

(l) Accurate evaluation of the reaction from the member, as one of the objects of the invention, can be achieved by dividing the time interval to realize the calculated value into a plurality of intervals, calculating the control signal for the actuator at respective times of the dividing points by the digital computer and providing the control signal to the controller for the actuator to precisely control the actuator and thus make the displacement response of the actuator a configuration of the time function.

(m) By parallel calculation of the vibration response of the numerical model and the control signal at each timing of the dividing points, concentration of the calculation timings of the control signals for the actuator can be avoided to enhance precision of control of the vibration response of the actuator.

In addition, since the calculation of the control signals for the actuator does not depend on the calculation of the vibration response of the numerical model, the precision level of control of the vibration response of the actuator can be improved. Furthermore, the precision level of vibration response evaluation can be enhanced.

(n) According to the present invention, it is possible to support the overall member as the object of excitation by the actuator. In such case, by forming one of the actuators with the shaking table which can mount a large structure, the application of the present invention can be extended for the large structure.

(o) By outputting the calculated vibration response in a form of voltage or so forth during the vibration test, whether or not the vibration response is reasonable during vibration test can be evaluated. Therefore, by this approach, such termination or interruption of the test can be made even at the mid-point of the test.

On the other hand, by storing not only the results of the vibration test for the member but also the calculated value of the vibration response in the digital computer, and outputting them after completion of test, evaluation of the vibration response of the overall structure as well as the vibration response of the member becomes possible.

DESCRIPTION OF THE PREFERRED EMBODIMENT

The preferred embodiments of the present invention will be discussed herebelow with reference to the drawings.

Figure 1:
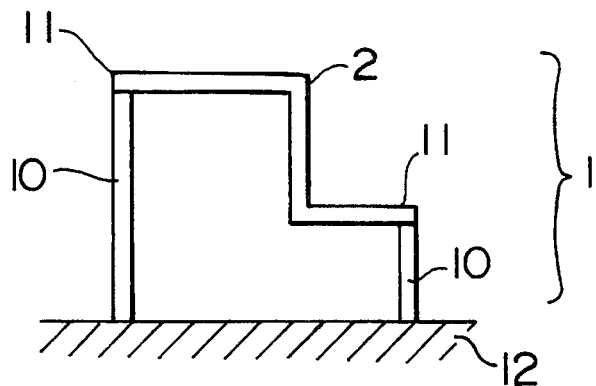
FIG. 1 is an explanatory illustration of a structure to be an object for evaluation of a vibration response.
Figure 2:
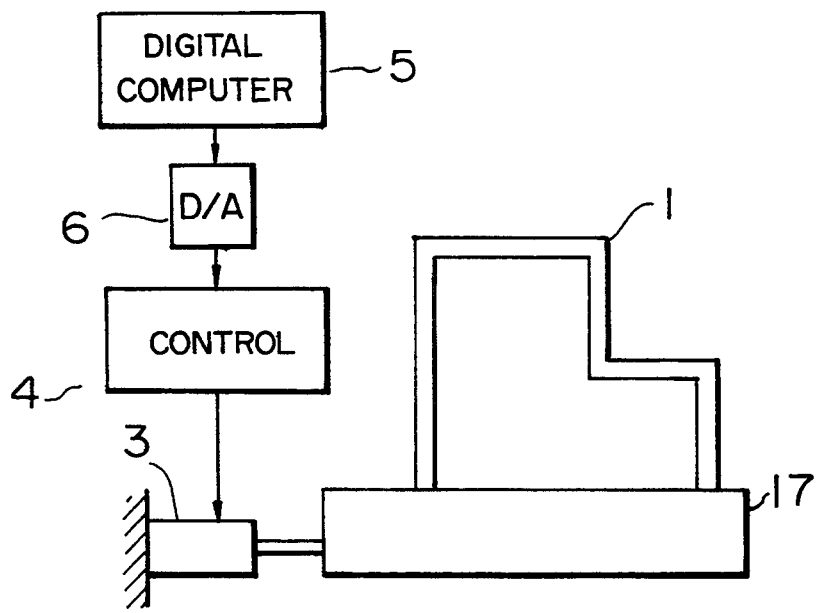
FIG. 2 is an explanatory illustration showing a conventional vibration testing method.

In the prior art, when a vibration test is to be performed for the structure 1 as shown in FIG. 1, an excitation test is performed by means of a shaking table 17 as shown in FIG. 2. However, when the object structure 1 for the test is large, there are problems in that it is very costly to produce a testing model and it requires a large size shaking table facility.

Figure 3:
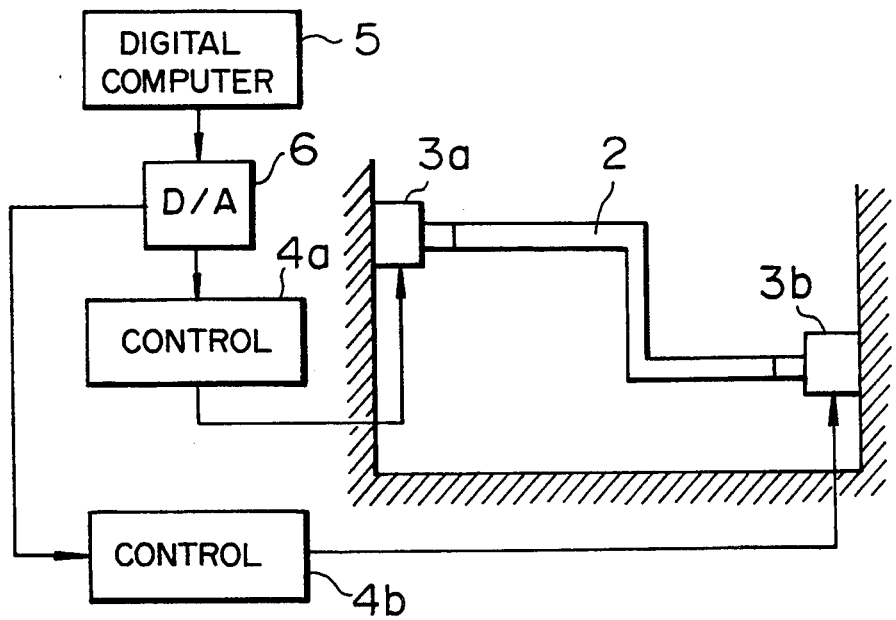
FIG. 3 is an explanatory illustration showing another conventional vibration testing method.
Figure 4:
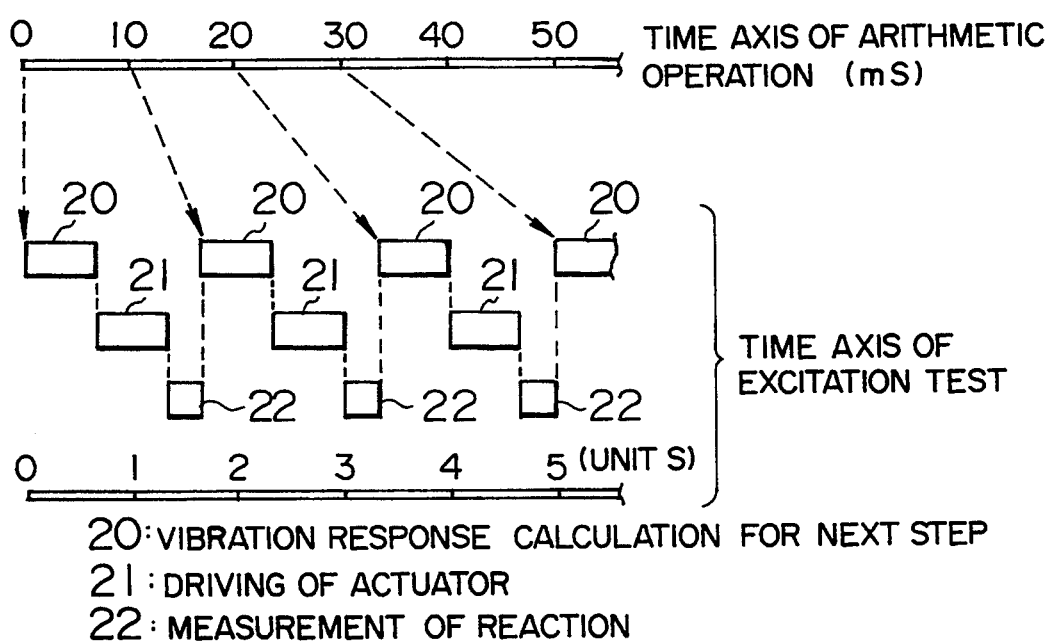
FIG. 4 is a time table of a conventional on-line testing system.

As an approach for the above-mentioned problem, there has been considered a method, in which only a part of the object structure 1 for test shown in FIG. 1 is taken as an actual member, and the excitation test is performed by means of an actuator 3 as shown in FIG. 3 at boundary points 11. However, in such an excitation test method, since the predetermined excitation signal is fed from a digital computer 5 to a control circuit 4 through a digital-to-analog converter (hereafter referred to as D/A converter) 6, for example, it is possible that a predetermined vibration cannot be achieved due to vibration characteristics of the testing object 1 or 2 at the border point 11, or it is required to modify the excitation signal depending upon the vibration response of the testing object. This can make it difficult to perform the vibration test with high accuracy.

To solve the above-mentioned problem is another object of the present invention. One embodiment of the present invention will be discussed herebelow with reference to FIGS. 5 and 6.

Figure 5:
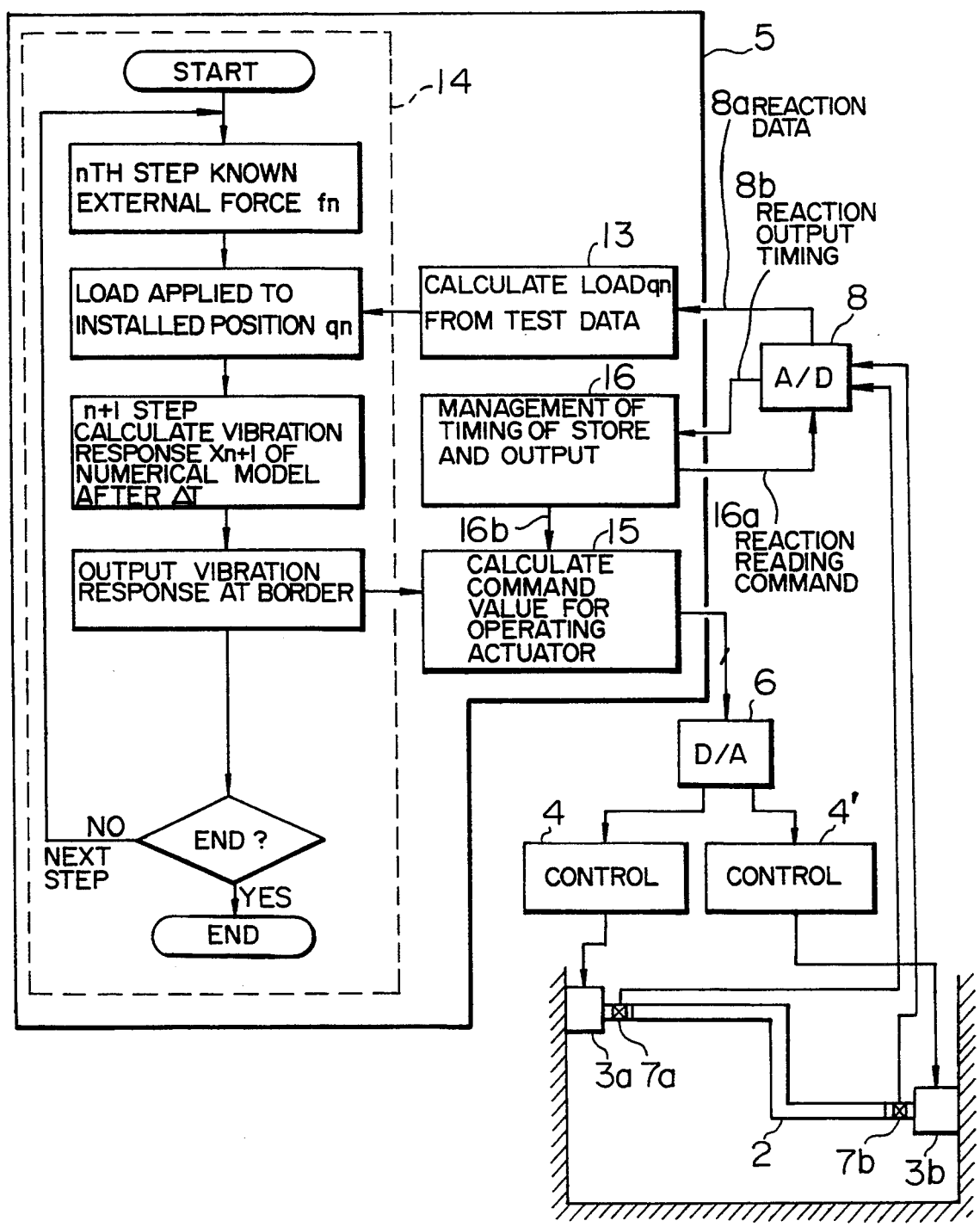
FIG. 5 is a block diagram of one embodiment of a testing system according to the present invention.
Figure 6:
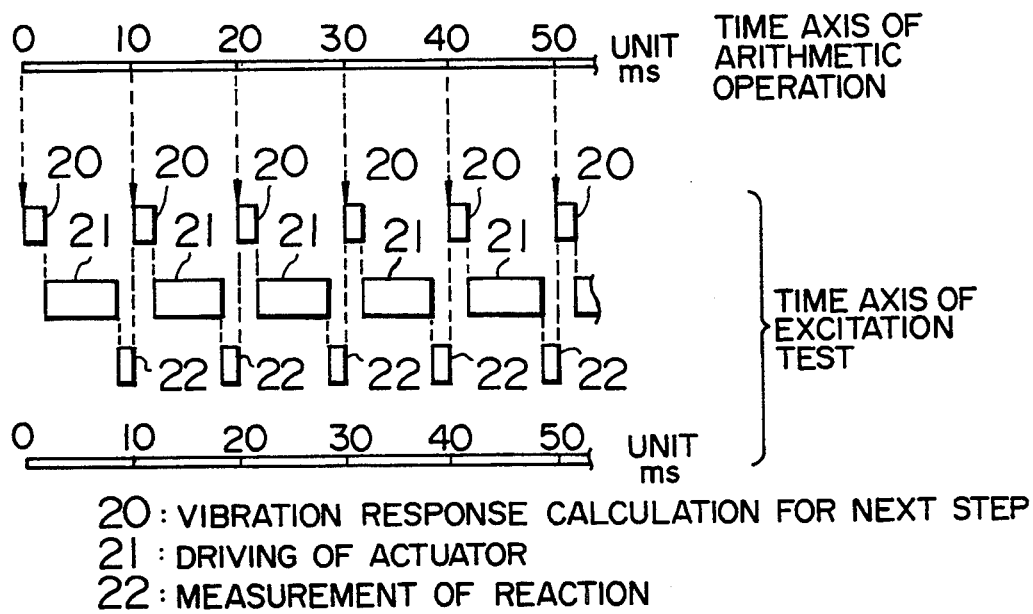
FIG. 6 is a time table in one embodiment of the invention.

In FIG. 5, when a timing signal 16b is output from a management section 16, an arithmetic block 15 feeds a command value to a D/A converter 6. Then, among data of a testing object structure 1, the portion 2 to be tested with the actual member (hereafter referred to as "member") is driven by actuators 3a–3b. Data of the structure 10 other than the member, is established as a numerical model by way of finite element method, for example, and input to the digital computer 5. Two control circuits 4 and 4' receive a signal (21 in FIG. 6) corresponding to vibration response, such as displacement, acceleration and so forth, calculated by the digital computer 5 through the D/A converter 6 and control the actuators 3a and 3b, respectively. The digital computer 5 is connected to an analog-to-digital converter (hereafter referred to as "A/D converter") 8 for reading signals of load cells 7a–7b, together with the D/A converter 6. The management section 16 feeds a read command signal 16a for reading the output signal of the A/D converter corresponding to a reaction to the A/D converter (21 of FIG. 6).

The digital computer 5 is responsive to the timing signal via a signal line 8b from the A/D converter 8 to obtain a load (hereafter referred to as "reaction") signal to be applied to the actuator 3 from the member 2 via a signal line 8a. The digital computer 5 has a processing function 14 for calculating vibration of the portions of the structure 10 other than the member (this portions will be hereafter referred to as "numerical model"), (20 of FIG. 6). The principle of calculation will be discussed herebelow.

Among the object structure 1 for analysis as shown in FIG. 1, one part is the member 2 and other parts of the structure 10 is modeled as numerical model. The analyzing object structure 1 and the model of the actual parts can be the structure, such as construction or piping and so forth, and can be of random configuration. When external force acts on the analyzing object structure 1, the vibration response of the numerical model can be obtained by solving the following equation of motion.

$$M\ddot{X} + C\dot{X} + KX = f + q \tag{1}$$

where M: a mass matrix of the numerical model 10; C: a damping matrix of the numerical model 10; K: a stiffness matrix of the numerical model 10; X: a displacement vector of the numerical model 10, f: an external force vector applied to the numerical model 10, q: a load (reaction) vector applied from the member 2 to the numerical model 10, and represents differentiated value in time.

Since f is a known external force vector applied to the parts of the numerical model through a foundation 12 due to an earthquake or other force, when the load vector q depending upon vibration of the member can be obtained, vibration response (the displacement vector X, the velocity vector $\dot{X}$, the-acceleration vector $\ddot{X}$ or so forth) can be determined by solving the foregoing equation (1). The digital computer 5 is provided a function for calculating the vibration response of the numerical model 10 using the weight applied to the numerical model 10 from the member 2.

The manner of processing to be performed by the processing function 14 installed in the digital computer 5 of the shown embodiment of the testing system will be discussed herebelow. It solves the equation (1) of motion with respect to every small time interval $\Delta t$. It is assumed that nth step is reached at the current timings interval. The manner of calculation of vibration at the step after $\Delta t$ is as follows:

(1) The known external force $f_n$ is applied to the numerical model 10 at the timing of the n-th step, due to the earthquake or other force.

(2) A load $q_n$ to be applied from the member 2 to the numerical model 10 is determined by A/D conversion of the reaction with the converter and multiplying a predetermined coefficient.

(3) The vibration response (displacement vector $X_{n+1}$) of the numerical model at a (n+1)th step after the $\Delta t$ period is calculated. At this time, various processing functions are available for use. When a central difference method is employed, for example, the following equation can be established by solving the foregoing equation (1) with the displacement $X_{n-1}$ at the preceding step, the current displacement $X_n$, the external force $f_n$ and the load $q_n$:

$$X_{n+1} = \left(M + \frac{\Delta t}{2} C\right)^{-1} \left\{ M(2X_n - X_{n-1}) + \frac{\Delta t}{2} CX_{n-1} - (\Delta t)^2(KX_n - f_n - q_n) \right\} \tag{2}$$

(4) Among the calculated vibration response (displacement vector $X_{n+1}$, for example) of the numerical model 10, the excitation signal for achieving the vibration response value at the boundary point 11 with the member is output.

(5) Then, the method is advanced to the next step.

By repeating the foregoing process, it becomes possible to perform real time vibration test of the member with respect to the given external force. As a method for solving the foregoing equation (1), various processes are available for use.

In order to execute vibration analysis as set forth above, the reaction vector q has to be measured with high precision. Therefore, it becomes necessary to accurately achieve the vibration response of the member in the excitation test. The following are the necessary matters for accomplishing this accurate measurement.

The equation of motion of the member can be expressed as follows:

$$M\ddot{w} + C\dot{w} + Kw = L \tag{3}$$

where w: a displacement vector of the member;
M: a mass matrix of the member;
C: a damping matrix of the member;
K: a stiffness matrix of the member;
L: an applied force vector of the member
.: represents differentiated value relative to time.

The displacement vector can be expressed by the following equation (4):

$$w = \begin{Bmatrix} w_u \\ w_k \end{Bmatrix} \tag{4}$$

where $w_k$: a displacement vector at the boundary points;
$w_u$: a displacement vector at other than boundary points.

Corresponding to the foregoing expression, the respective matrix of the mass, the damping and the stiffness and the applied force vector can be expressed by the following equation (5):

$$M = \begin{bmatrix} M_u & M_{uk} \\ M_{uk}^T & M_k \end{bmatrix} \tag{5}$$

$$C = \begin{bmatrix} C_u & C_{uk} \\ C_{uk}^T & C_k \end{bmatrix}$$

$$K = \begin{bmatrix} K_u & K_{uk} \\ K_{uk}^T & K_k \end{bmatrix}$$

$$L = \begin{Bmatrix} L_u \\ L_k \end{Bmatrix}$$

where T represents a transpose.

Accordingly, the equation of motion of the displacement vector other than the boundary points can be expressed by the following equation (6):

$$M_u w_u + C_u \dot{w} + K_u w_u = L_u - M_{uk} \ddot{w}_k - C_{uk} \dot{w} - K_{uk} w_k \tag{6}$$

The displacement vector at the points other than the boundary points can be divided into a pseudo-static component and a dynamic component as expressed in the following equation (7)

$$w_u = w_d + w_s \qquad (7)$$

where $w_s$: a pseudostatic component;

$w_d$: a dynamic component.

Between the pseudostatic component and the displacement at the boundary points, the relationship as expressed in the following equation (6) is established:

$$K_u w_s + K_{uk} w_k = 0 \qquad (8)$$

Accordingly, the pseudostatic component can be expressed by:

$$w_s = -K_u^{-1} K_{uk} w_k = R_I w_k \qquad (9)$$

On the other hand, the dynamic component can be expressed in the form of an equation of motion:

$$M_u \ddot{w}_d + C_u \dot{w}_d + K_u w_d = L_u - (M_u R_I + M_{uk})\ddot{w}_k - (C_u R_I + C_{uk})\dot{w}_k \qquad (10)$$

Accordingly, to achieve vibration of the member with high accuracy and to evaluate the reaction with high precision, it is necessary to input not only the displacement at the boundary points but also the velocity and acceleration.

Therefore, in the shown embodiment, the timing for inputting the test data and for outputting the excitation signal of the actuator by the management section 16, the vibration response after Δt of the timing of measurement of the reaction, can be derived through arithmetic operation. Even in the real excitation test, by realizing this response after Δt of the timing of measurement of the reaction at the position of the actuator, it becomes possible to perform excitation and arithmetic operation in real time. Namely, the time axis of the arithmetic operation can be made coincide with the time axis of the excitation test. Therefore, in the excitation test of the member, even the time differentiated elements of the velocity, acceleration and so forth can be accurately input to enable high precision vibration test. The foregoing discussion is applicable not only for when the member can be dealt with as a linear system but also for the case that the member is to be dealt with as a non-linear system. As can be appreciated from the foregoing equations (9) and (10), it is necessary to realize the displacement, the velocity and the acceleration at the boundary points without changing structure, for performings a high precision vibration test. However, depending upon the vibration characteristics of the member, it is sometimes unnecessary to realize all of the displacement, velocity and acceleration, thereof. For instance, when the mass weight of the member 2 is much smaller than that of the numerical model, and the construction has substantially small damping, the dynamic component can be ignored. In such case, it is only required to realize the displacement at the position of the actuator. In this case, although it is not essential to realize the displacement in real time, the testing period can be shortened by performing the excitation test in real time. On the other hand, when the mass weight is small but the damping cannot be ignored, it is required to realize the displacement and the velocity. Also, when the mass weight cannot be ignored in view of that the numerical model damping is substantially small, it is required to realize only the displacement and the acceleration.

When both of the mass weight and the damping are considered to be substantial, all of the displacement, the velocity and the acceleration have to be realized by the actuators. Also, when only a single boundary point or when a plurality of border points are present but their characteristics are completely identical, the pseudo-static component becomes only shifting of the rigid body. The reaction for this component can be ignored. Furthermore, the damping component can be frequently ignored. Therefore, in such case, it is required to realize only acceleration by the actuator. As set forth above, by selecting vibration response to the realized characterized, depending upon the characteristics of the member, it can advantageously facilitate control of the actuator in comparison with the case where all of the displacement, the velocity and the acceleration are realized for all the cases.

Next, discussion will be given for the method to realize the vibration response by one embodiment of the invention.

Figure 7:
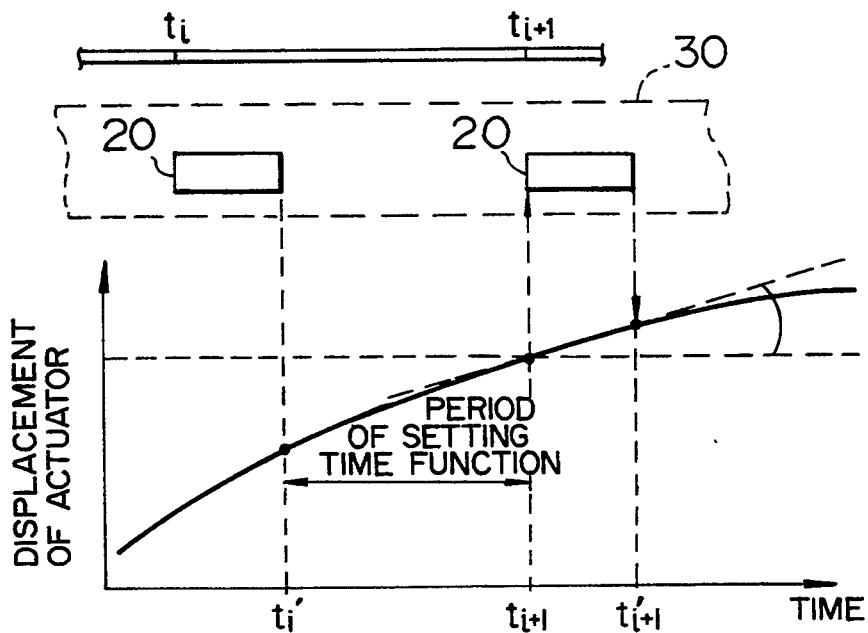
FIG. 7 is an explanatory illustration showing a control of an actuator in one embodiment of the invention.

FIG. 7 shows a typical timing table of the displacement of the actuator and the operation 30 in a CPU. Here, as an example of the vibration response to be realized, the displacement and the velocity is considered. At a time $t_i$, the reaction is input. Then, at a time $t_i'$ ($< t_{i+1}$), calculation 20 of the vibration response for the next step at a time $t_{i+1}$ (after Δt) is completed. Using the result, a displacement function of the actuator in a period between the time $t_i'$ and the time $t_{i+1}$ is determined.

At this time, it becomes necessary to realize continuity of the displacement and speed at the time $t_i'$ and displacement and speed at the time $t_{i+1}$. Therefore, since there are four boundary conditions constraining the displacement function, when the displacement function is established as a function which can be sequentially and differentiated in two steps and is also independent, and namely, which can be expressed by a sum of functions with an independent vector constituted of a total of four components of the displacements and velocity at the time $t_i'$ and the time $t_{i+1}$, the foregoing condition can be satisfied.

By preliminarily determining such function and establishing a table with the values thereof, by calculating respective coefficients with the four boundary conditions, the displacement can be defined in a form of following equation:

$$f(t) = a f_a(t) + b f_b(t) + c f_c(t) + d f_d(t) \qquad (11)$$

where f(t): displacement function;

$f_a(t) - f_d(t)$: mutually independent displacement functions; and a–d: coefficients determined by the boundary condition.

On the other hand, employing a null function, linear function, quadratic function or cubic function of time as the displacement function in the right side, the displacement function f(t) in the left side becomes a cubic function of the time.

When the vibration responses to be realized are the displacement and the acceleration, it becomes necessary to make the displacement, and to realize the velocity and the acceleration at the time $t_i'$ consistent and the displacement and the acceleration at the time $t_i$, in order to maintain continuity with the preceding step. Therefore, the boundary conditions increase in number to five. Therefore, the displacement function is expressed by a sum of five functions, in which the vectors are mutually independent and constituted of the components of the displacement, velocity and acceleration at a time $t_i'$ and the displacement and acceleration at the time $t_{i+1}$.

Employing the null function, linear function, quadratic function, cubic function and biquadratic function as respective functions, the displacement function becomes a biquadratic function.

On the other hand, when the vibration responses to be realized are displacement, velocity and acceleration, the boundary conditions increase in number to six. Therefore, the foregoing condition can be achieved by establishing the displacement function which can be expressed by a sum of functions, in which vectors are mutually independent to each other and constituted of six components of the displacement, the velocity and the acceleration at times $t_i'$ and $t_{i+1}$.

Employing the null function, linear function, quadratic function, cubic function, biquadratic function and quintuple function, the displacement function becomes a quintuple function. With these method, the vibration response necessary for the actuator can be obtained.

It should be noted that, in a period between $t_{i+1}$ and $t_{i+1}'$, control can be performed by extrapolation of the displacement function in a period between the $t_i'$ to $t_{i+1}$, for example.

Figure 8:
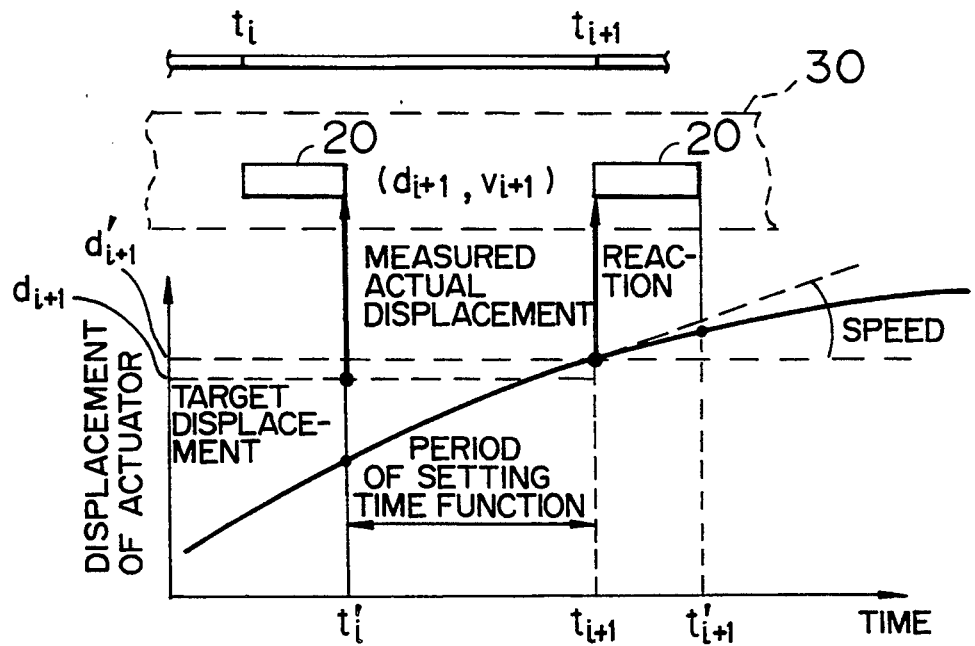
FIG. 8 is an explanatory illustration showing a control of an actuator in another embodiment of the invention.

Next, discussion will be given for one embodiment for further improving precision of displacement response to be realized by the actuator. It is possible that the actual displacement of the actuator can be slightly different from the calculated value. Therefore, as shown in FIG. 8, the actual displacement is measured in conjunction with the measurement of the reaction. Then, an error between the actually measured displacement $d'_{i+1}$ and the calculated value $d_{i+1}$ is corrected in a step-by-step fashion.

Figure 9:
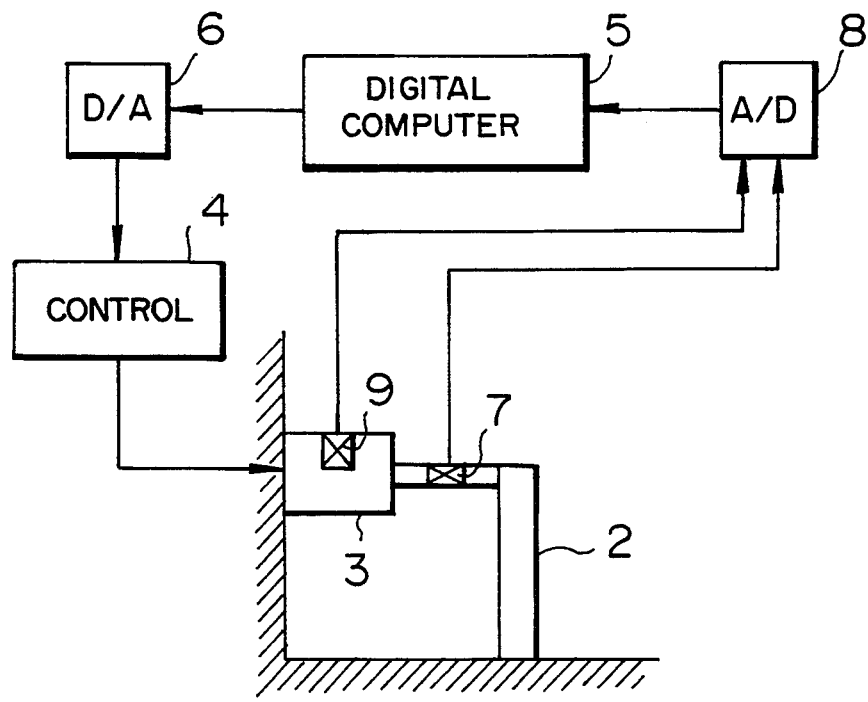
FIG. 9 is an explanatory illustration showing one embodiment of a vibration testing system according to the invention.

For this purpose, as shown in FIG. 9, a displacement measuring device 9 is provided on the actuator 3 or other portion to provide an input to the digital computer 5 via the A/D converter 8. Even when such correction is to be made, the configuration of the displacement function can be maintained as set forth above. In the shown embodiment, the displacement accuracy of the actuator can be improved to permit the vibration test with even higher precision.

One embodiment of the present invention suitable for driving the actuator is the above-mentioned configuration of the displacement function.

In order to realize the displacement function such as those discussed above, it becomes necessary to calculate the excitation signal by taking the dynamic characteristics of the actuator into account and to feed the excitation signal to the control circuit for the actuator in an interval shorter than the interval of the arithmetic operation.

Figure 10:
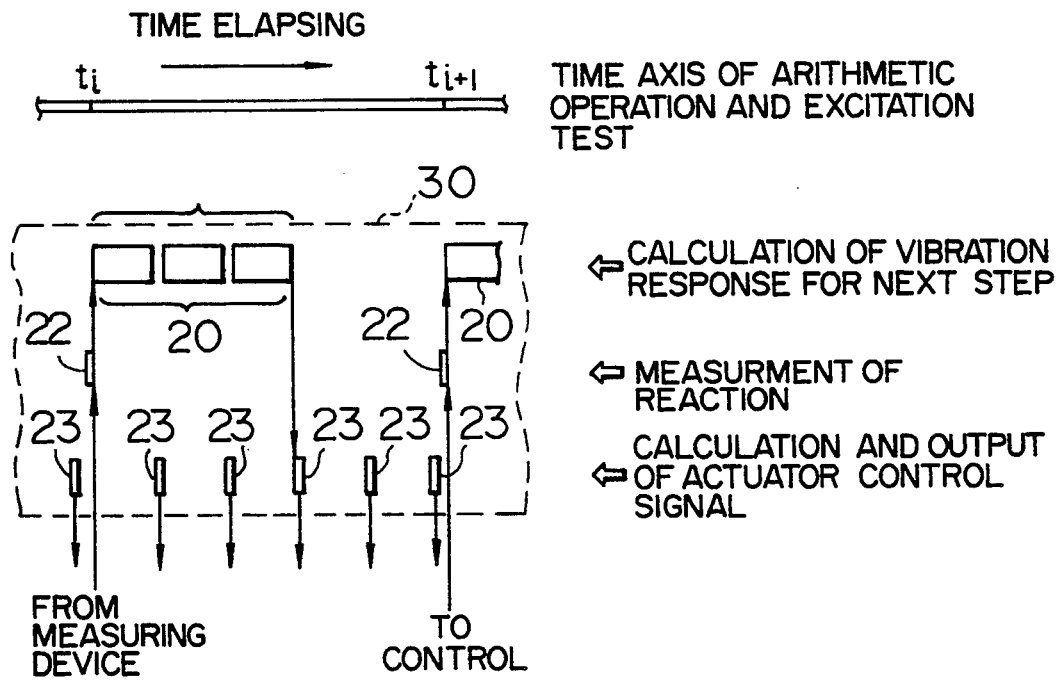
FIG. 10 is a time table of use of CPU in one embodiment of the invention.

FIG. 10 shows a time table of the operation 30 in the CPU of the digital computer 5. As shown, after measurement 22 of reaction, by performing calculation of the excitation signal with appropriately interrupting calculation 20 for vibration response, it becomes possible to perform calculation of the excitation signal with a shorter interval.

Figure 11:
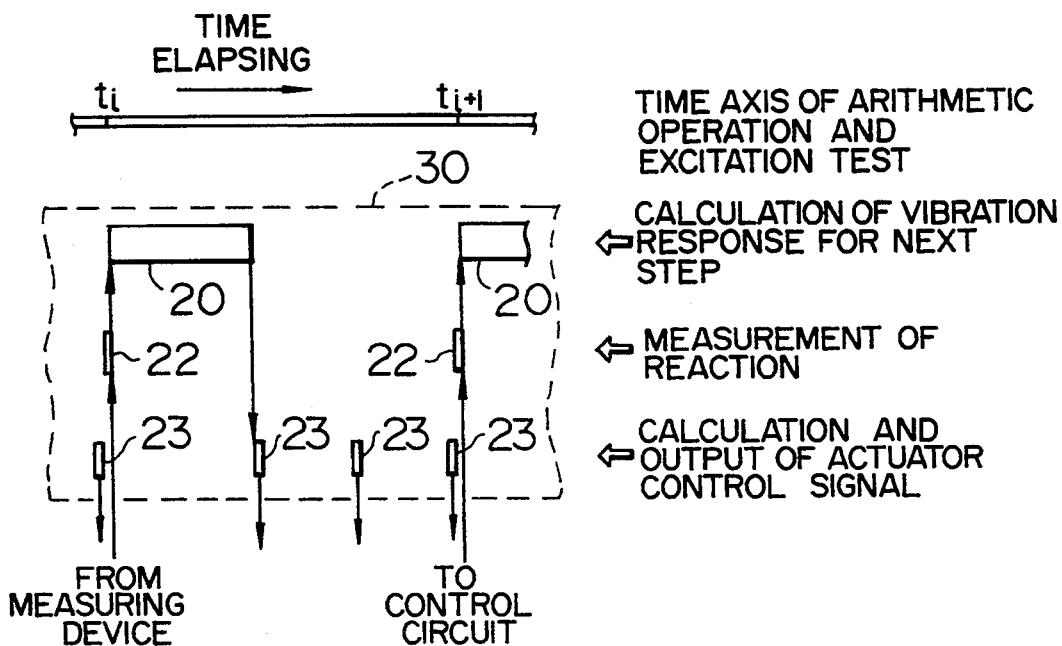
FIG. 11 is a time table of use of CPU in another embodiment of the invention.
Figure 12:
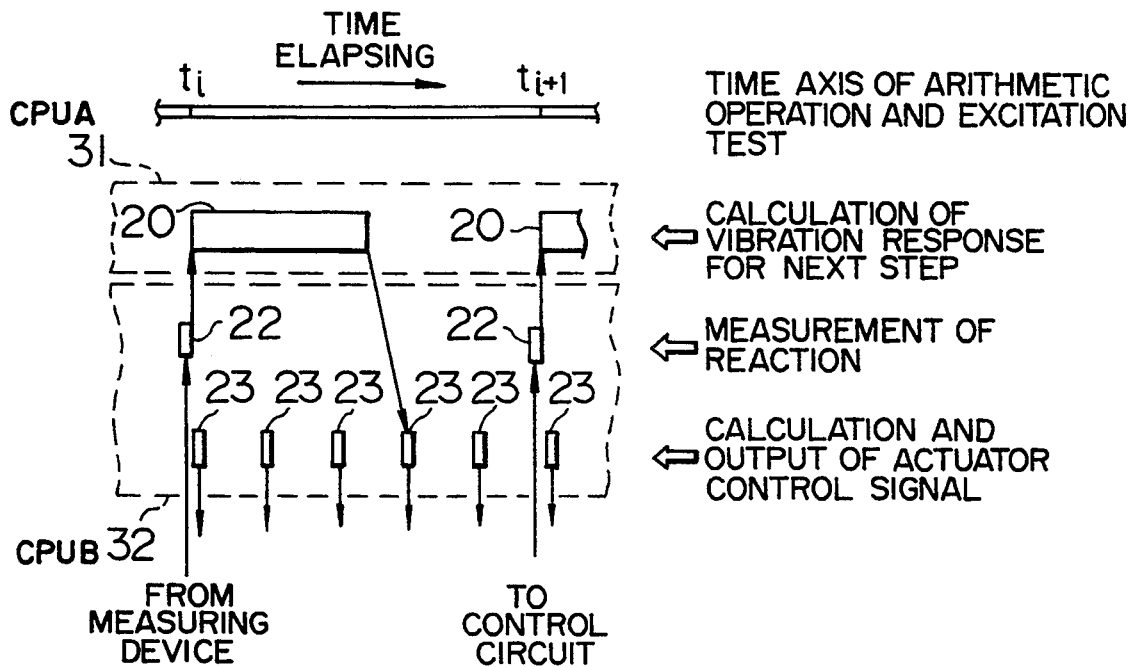
FIG. 12 is a time table of use of CPU in a further embodiment of the invention.

On the other hand, as shown in FIG. 11, an approach can be taken to perform calculation 20 for the vibration response without interruption and after completion thereof, to perform calculation 22 of the excitation signal with the shorter interval. By this process, the displacement control for the actuator becomes possible. In the above-mentioned embodiment, there is encountered a problem in that the period required for completion of arithmetic operation is prolonged due to necessity of calculating of the excitation signal. As a solution, discussion will be given for one embodiment of the present invention which is effective in solving the problem set forth above, will be discussed herebelow with reference to FIG. 12.

In the shown embodiment, the digital computer 5 has two CPUs. One CPUA 31 performs calculation 20 for the vibration response. The other CPUB 32 performs the measurement 22 of the reaction and calculation 23 of the excitation signal. The results of calculation for the vibration response is transferred from the CPUA 31 to the CPUB 32 in synchronism therewith. With the shown embodiment, the calculation 23 of the excitation signal can be done without causing interruption of the calculation 20 of the vibration response.

Figure 13:
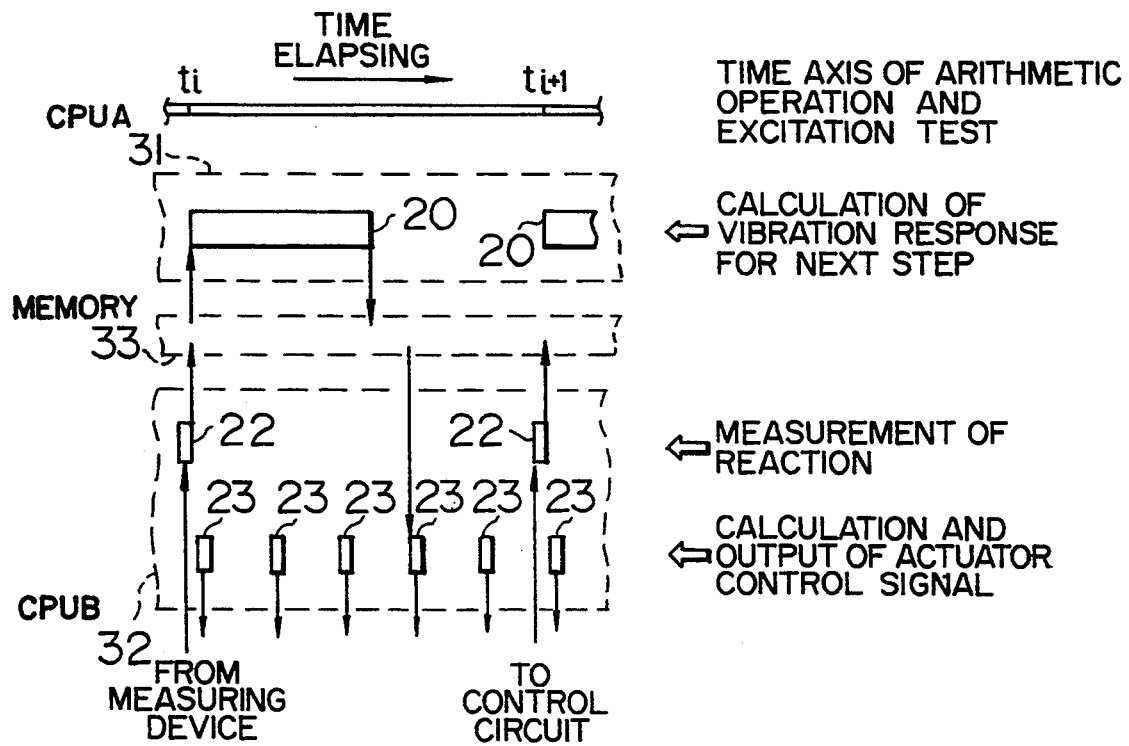
FIG. 13 is a time table of use of CPU in a still further embodiment of the invention.

Another embodiment will be discussed with reference to FIG. 13. In the shown embodiment, a memory 33 accessible from the CPUA 31 and CPUB 32 is provided in addition to the CPUA and CPUB. The result of the calculation 20 for the vibration response is stored the memory 33. Therefore, the CPUB 32 can obtain data without requiring synchronization with the CPUA 31. On the other hand, the measured reaction is transferred from the CPUB 32 to the CPUA 31 through the reversed route.

Figure 14:
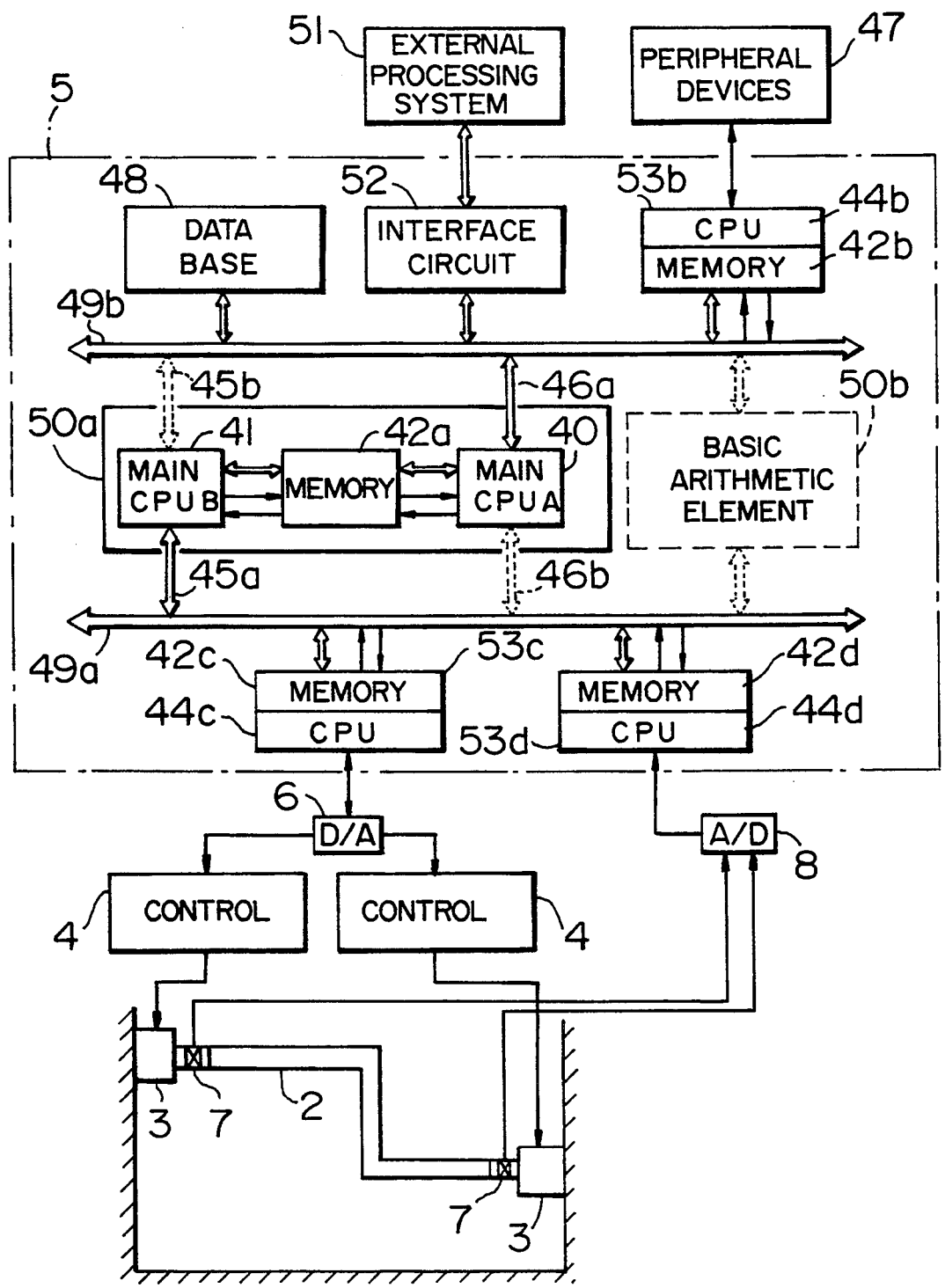
FIG. 14 is a block diagram of one embodiment of the present invention.

The construction of the testing system preferred for implementation of the above-mentioned embodiment will be discussed herebelow with reference to FIG. 14. In the shown embodiment, a basic arithmetic element is formed with a main CPUA 40, a main CPUB 41 and a memory 42 accessible from the CPUs. The main CPUA 40 performs analysis of the vibration response. The main CPUB 41 performs calculation of the excitation signal and measurement of the reaction. The CPUA 40 is communicated with a bus 49$b$ through a bus line 46$a$. To the bus 49$b$, a data base 48 necessary for analysis of the vibration response, an external processing system, such as a large scale computer or so forth via an interface 52 and peripheral devices 47, such as a display, a keyboard or so forth via an input and output processing system 53$b$ which is formed with a CPU 44$b$ and a memory 42$b$, are communicated. On the other hand, the main CPUB 41 is communicated with a bus 49$a$ via a bus line 45$a$. To the bus 49$a$, the D/A converter 6 and the A/D converter 8 are communicated via the input and output processing system 53$c$ and 53$d$. By the D/A converter 6, the excitation signal is provided for the control circuit 4 and thus the actuator 3 is driven. Then, the reaction from the member 2 is measured by the load cell 7. The result of measurement is input to the digital computer 5 from the A/D converter 8. It should be noted that it is possible to provide a plurality of the basic elements. Also, the main CPUA 40 can be communicated with the bus 49$a$ via the bus line 46$b$, and the main CPUB 41 can be communicated with the bus 49$b$ via the bus line 45$b$. With the shown embodiment, the process of the vibration test can be effectively implemented at high speed.

Next, discussion will be given for the embodiments applying the present invention for various members.

Figure 15:
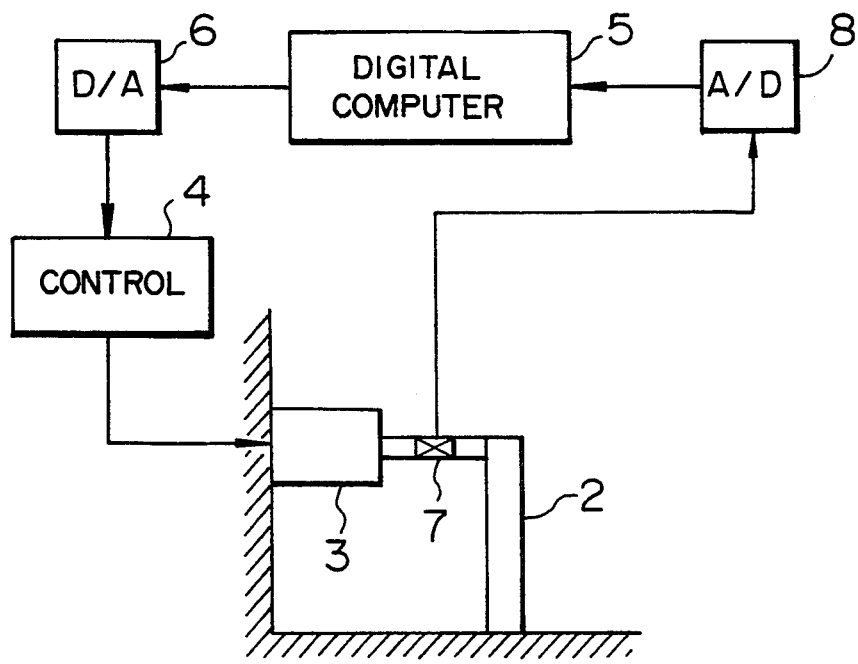
FIG. 15 is an explanatory illustration of one embodiment of a vibration testing system according to the invention.

In FIG. 15, the member 2 is fixed at one end and excited by the actuator at the other end. This embodiment is applicable for when the relative displacement (and the relative velocity) at the boundary point of the member 2 is an important factor for the reaction.

Figure 16:
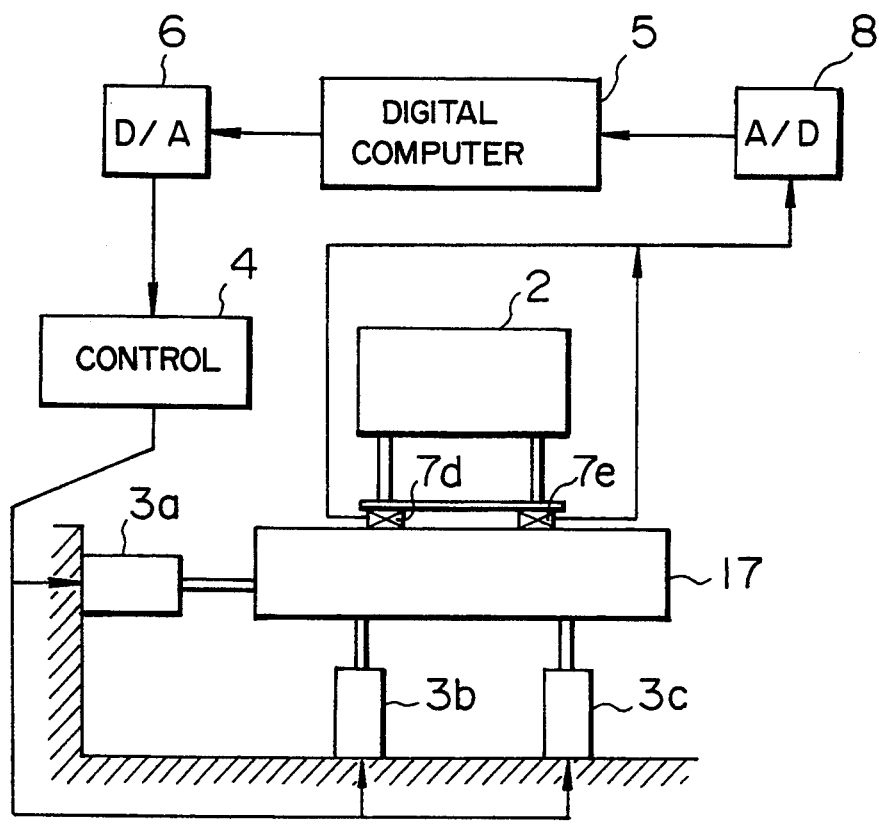
FIG. 16 is an explanatory illustration of another embodiment of a vibration testing system according to the invention.

FIG. 16 is applicable for when the numerical model and the member 2 are connected at the single boundary point, or when the behavior at the boundary points is always identical.

Figure 17:
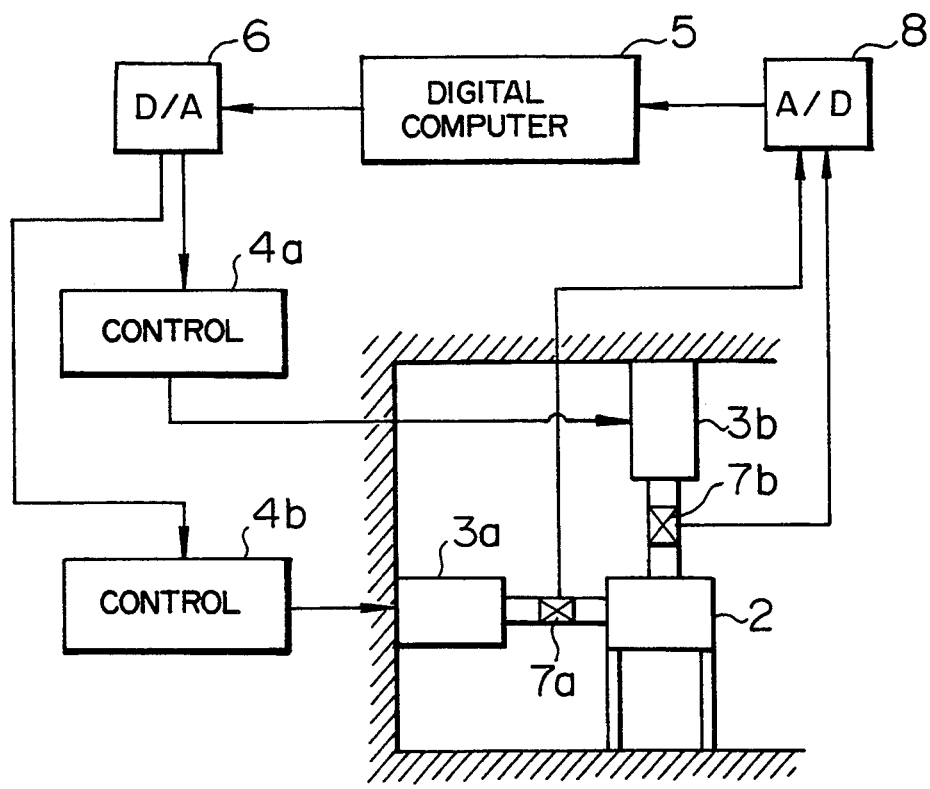
FIG. 17 is an explanatory illustration of a further embodiment of a vibration testing system according to the invention.

Furthermore, FIG. 17 shows an example where two actuators having different directions are connected. This embodiment is applicable for when the member 2 has a shell construction, for example, and the vertical load and the horizontal load significantly influence the vibration response.

Figure 18:
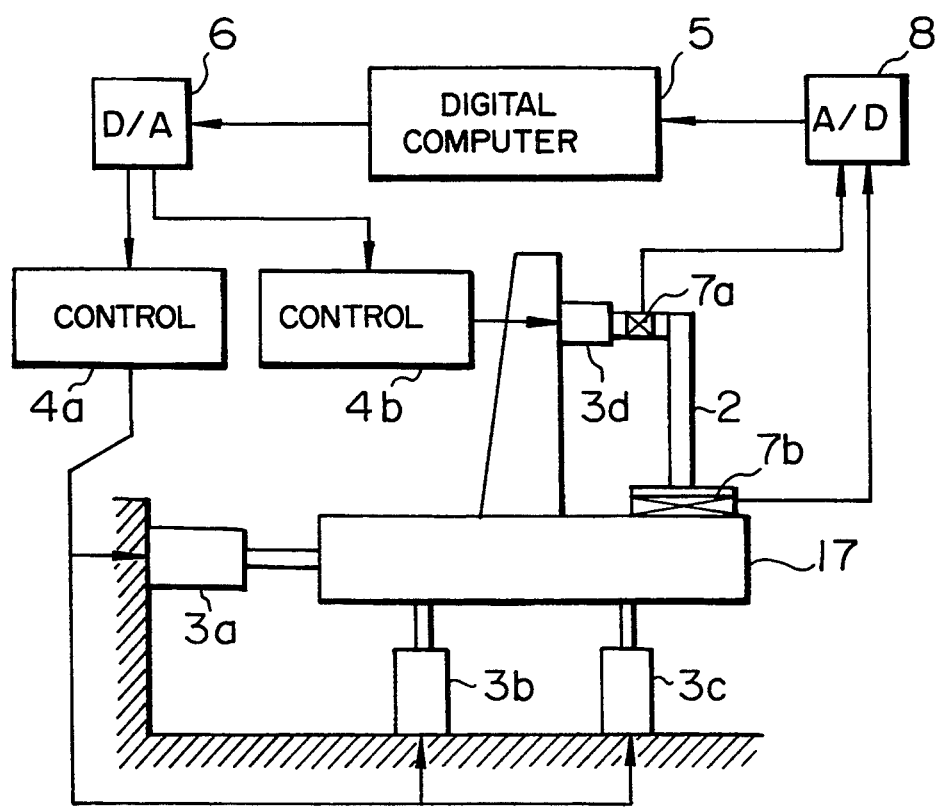
FIG. 18 is an explanatory illustration of a still further embodiment of a vibration testing system according to the invention.

On the other hand, FIG. 18 shows an embodiment, in which one of the actuators is the shaking table 17. When the member 2 per se has substantial weight, the weight cannot be supported by the normal actuators. However, the weight can be supported by the shaking table 17. Furthermore, by installing the actuator 3d on the shaking table 17, it becomes possible to apply the present invention even when the vibration response of the shaking table 17 becomes substantial. It should be noted that, when the absolute acceleration is to be realized by the shaking table, the actuator 3d realizes the relative vibration response relative to the boundary point defined by the shaking table 17.

Figure 19:
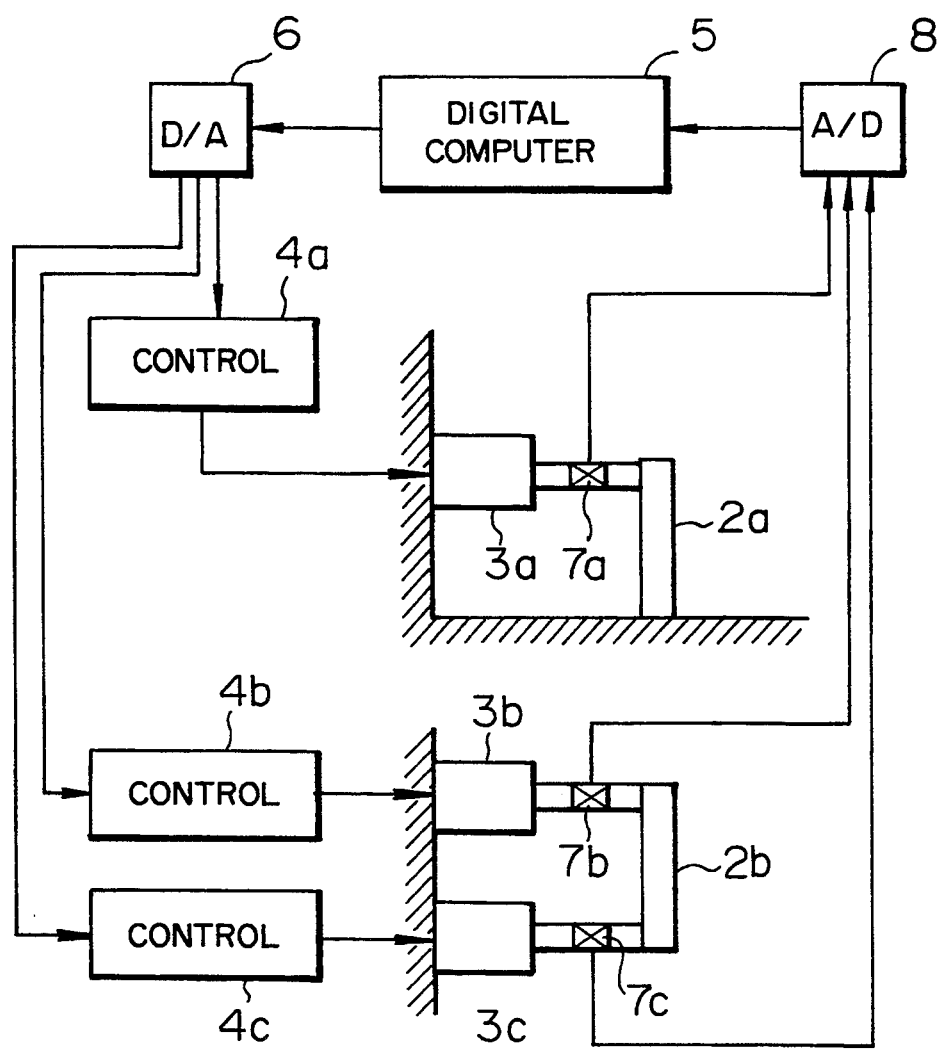
FIG. 19 is an explanatory illustration of yet a further embodiment of a vibration testing system according to the invention.

A further embodiment will be discussed with reference to FIG. 19. The foregoing embodiments are concentrated for the case where there is only one member. However, it is possible to equally excite a plurality of members 2a and 2b. Therefore, the vibration response of the more completed construction of the structure can be evaluated.

Figure 20:
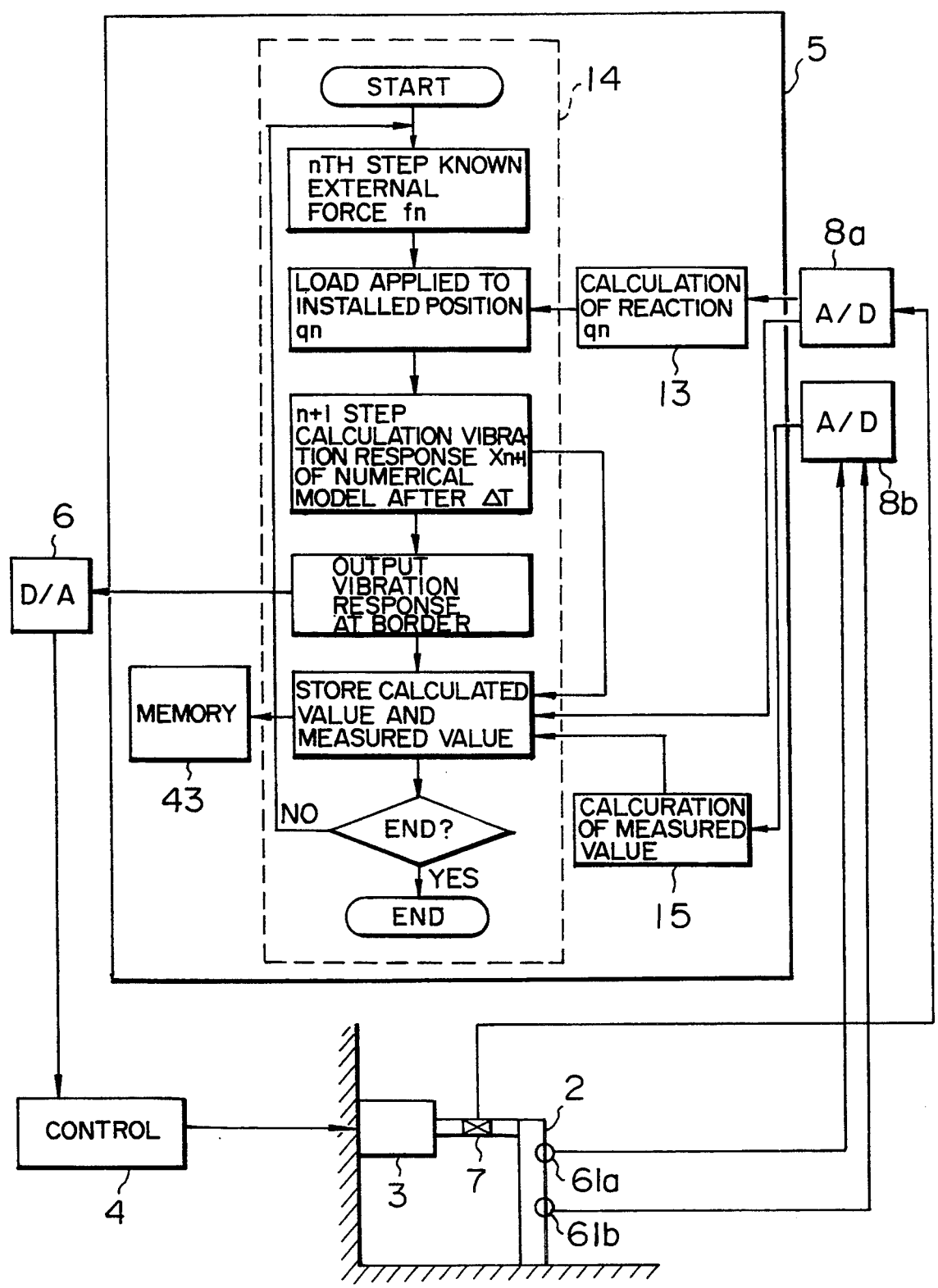
FIG. 20 is a block diagram of one embodiment of a vibration testing system according to the invention.

A still further embodiment will be discussed with reference to FIG. 20. In the shown embodiment, a vibration sensor 61 is provided on the member 2. The measured value of the vibration sensor 61 is input to the digital computer 5 via the A/D converter 8. Furthermore, the measured value is stored in the memory of the digital computer 5 together with the calculated value of the vibration response. Accordingly, the result of vibration test and the result of calculation can be evaluated after completion of the vibration test. This enables evaluation not only for the part of structure but also the overall construction of the object structure for vibration response analysis.

Figure 21:
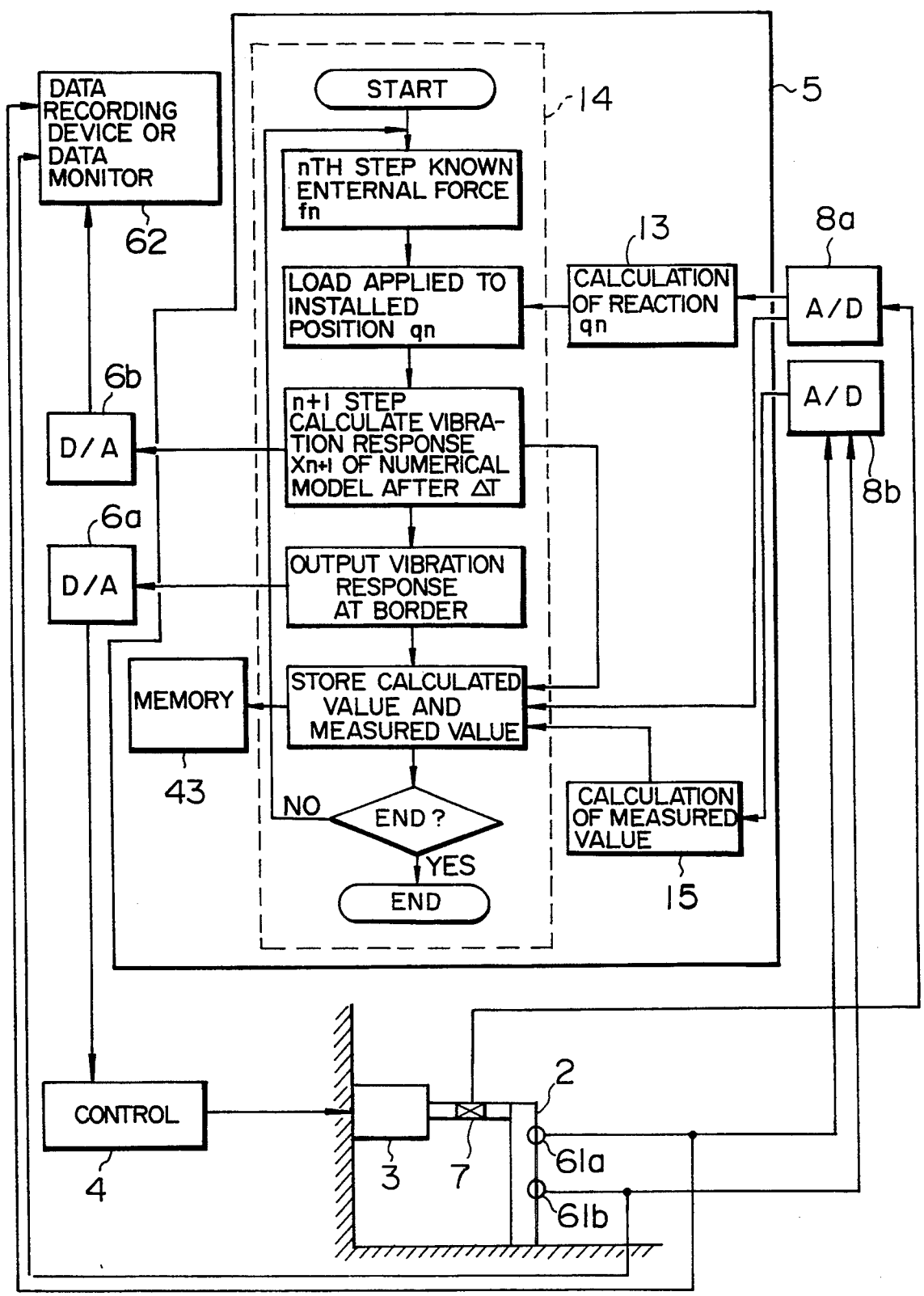
FIG. 21 is a block diagram of another embodiment of a vibration testing system according to the invention.

FIG. 21 shows yet a further embodiment of the present invention. In the shown embodiment, there is provided means for outputting the result of calculation for the vibration response by the digital computer 5 as a voltage value via the D/A converter 6. By the shown embodiment, the vibration response of the numerical model can be evaluated during testing. This enables termination or interruption of the test at a mid-point thereof in certain instances. Furthermore, since the result of the test can be obtained at the same time to complete the test to enable determination of the next test condition without requiring processing of the data in the memory, the testing period can be shortened.

Figure 22:
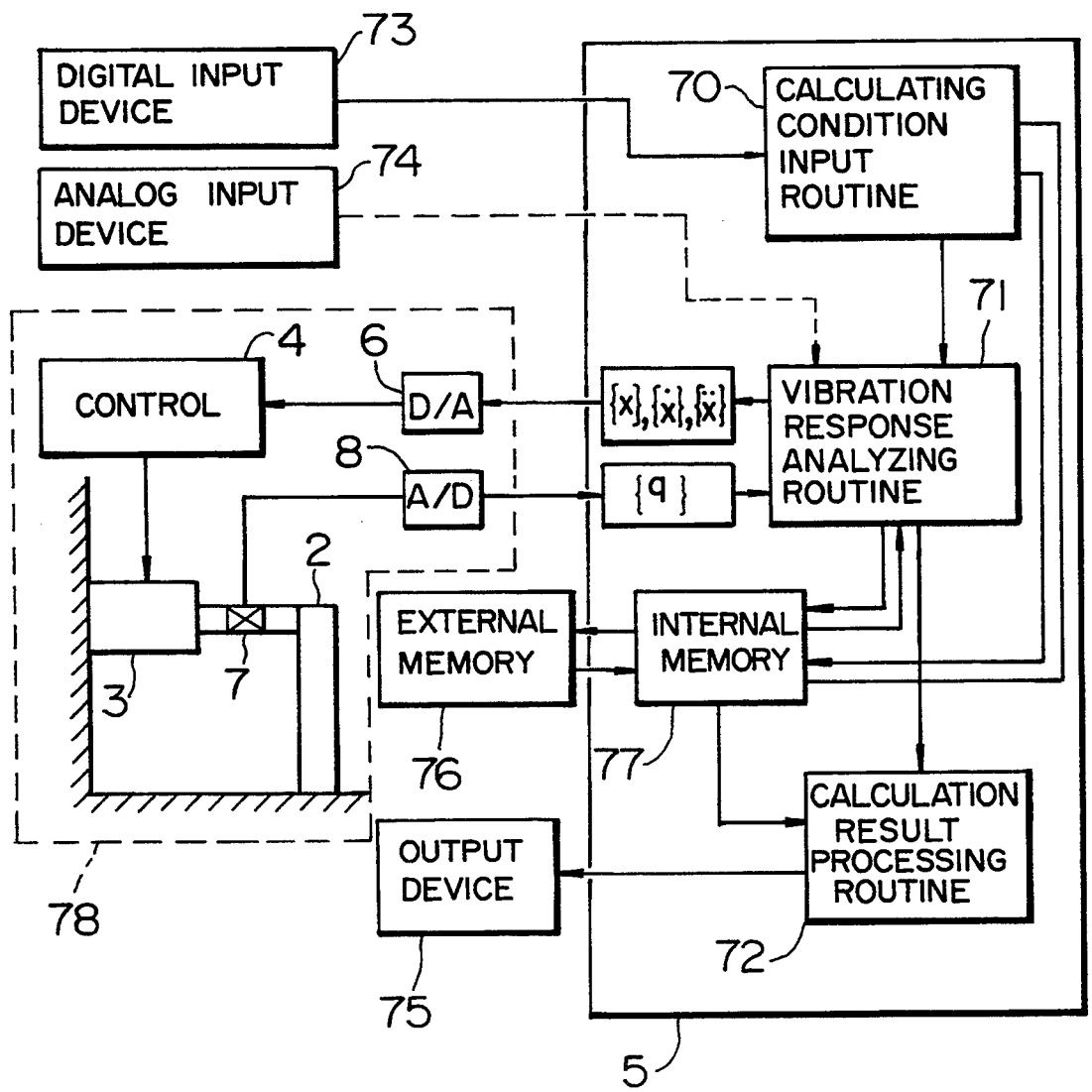
FIG. 22 is a block diagram of a further embodiment of a vibration testing system according to the invention.

FIG. 22 shows a still further embodiment of the present invention. The shown embodiment is directed to a vibration response analyzing system which comprises the digital computer 5, a digital input device 73, an external memory 76 and an output device 75. In the digital computer 5, a calculation condition input routine 70, a vibration response calculating routine 71 and a calculation result processing routine 72 are installed. Also, the system includes an internal memory 77 to be used for vibration analysis or so forth. The digital input device 74 can be replaced by an analog input device 74 for inputting the excitation force or so forth as the analog signal.

In the analysis of the vibration response, the structure is established as a model by way of the finite element method or so forth. The part thereof is excited in the identical time axis to the time axis of the vibration response analysis via the D/A converter 6 and the control circuit 4 and evaluated with a virtual finite element 78 which evaluates by inputting the measured value of the load cell 7 via the A/D converter 8. Therefore, the vibration response of the overall structure including a portion which is difficult to be modeled, can be precisely evaluated. It should be noted that the finite element 78 is not necessarily a single element but can comprise a plurality of elements.

It should be noted that, the actuator 3 in the former embodiments is controlled by the control circuit 4 with the analog signal. However, it is also possible to employ the actuator which can be directly controlled with the digital signal from the digital computer 5 without conversion by the D/A converter 6.

On the other hand, although the measured values of the displacement and the load are converted into analog signals by the measuring devices and input to the digital computer 5 via the A/D converter 8, it is possible to input to the digital computer 5 in a form of digital signals.

Figure 23:
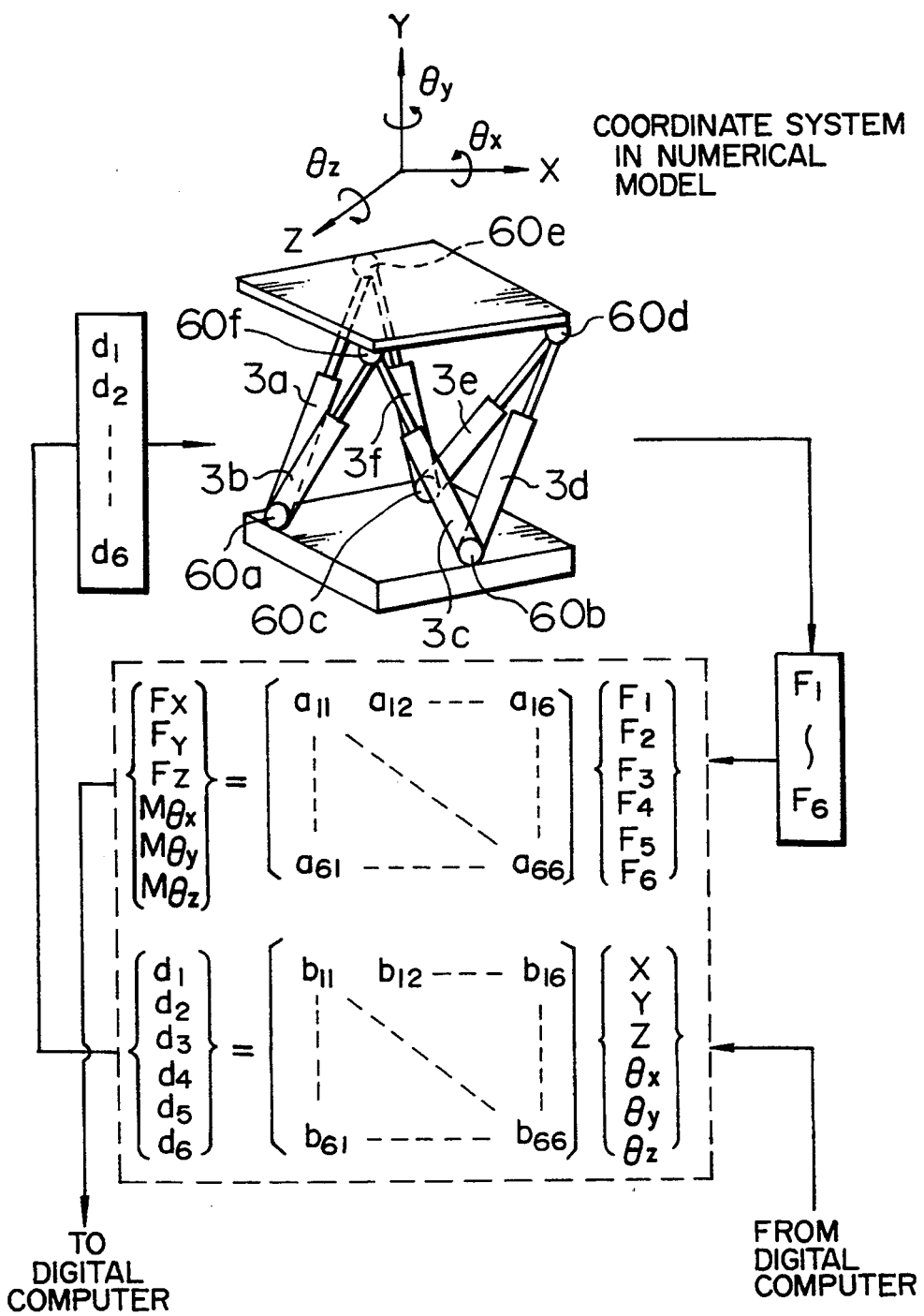
FIG. 23 is an explanatory illustration showing a six-degree-of-freedom actuator and a load converter.

Furthermore, although the actuator 3 is discussed as single axis type, it is possible to employ double axes or triple axes type depending upon the coupling condition between the member 2 and the numerical model 10. Furthermore, it is further possible to employ a six-degree-of-freedom actuator as shown in FIG. 23. In this actuator, six single axis actuators 3a to 3f are coupled by means of bearings 60a to 60f.

Realization of the result of the vibration response calculation by the actuator and calculation of the reaction necessary for calculation of the vibration response can be achieved by the actuators, displacement control for respective actuators and measurement of the reaction generated by respective actuators. However, in order to enable this, it becomes necessary to perform coordinate conversion as illustrated in FIG. 23.

In short, various constructions can be taken without departing from the principle of the invention.

What is claimed is:

1. A vibration testing system for testing a structure divided into a plurality of members, comprising:
   at least one actuator connected to at least one of the members of the structure;
   a controller for controlling said actuator;
   load cell means, mounted to said at least one member at a position in the vicinity of the connecting portion of said actuator, for measuring reaction applied to said actuator;
   arithmetic means, connected to said load cell means, for storing a numerical model of other of said members, and for calculating a vibration response of the numerical model connected to said member using the reaction measured in said load cell means;
   exciting means for providing an excitation signal for said controller based on a result of calculation for the vibration response of said numerical model by said arithmetic means;

time management means for providing said load cell means with a timing signal with a given interval for measurement of the reaction by said load cell means;

said time management means providing another timing signal to said excitation means with another given interval which is equal to or shorter than said given interval;

said arithmetic means calculating the vibration response after said time interval from a timing of measurement of said reaction based on the reaction signal and the results of calculation of the vibration response of the prior timing;

said controller controlling said actuator so the vibration response of said actuator after said predetermined period coincides with the result of calculation by said arithmetic means.

2. A vibration testing system as set forth in claim 1, further comprising:

displacement measuring means for measuring displacement of said actuator; wherein said vibration response includes the displacement.

3. A vibration testing system as set forth in claim 1, wherein the vibration response to be realized by said actuators is any one of a displacement, a velocity and an acceleration, or a combination thereof.

4. A vibration testing system as set forth in claim 2, wherein the vibration response to be realized by said actuators is any one of a displacement, a velocity and an acceleration, or a combination thereof.

5. A vibration testing apparatus as set forth in claim 2, wherein an error of an actual displacement relative to the calculated value based on the displacement measured value of said actuator at a time to realize the calculation value of the vibration response and said excitation signal are provided for said controller so that said error is compensated after a given period from the time in the given interval.

6. A vibration testing apparatus as set forth in claim 3, wherein at least one of said actuators is a shaking table for providing acceleration in said excitation signal, on which a member is mounted.

7. A vibration testing apparatus as set forth in claim 4, wherein at least one of said actuators is a shaking table for providing acceleration in said excitation signal, on which a member is mounted.

8. A vibration testing apparatus as set forth in claim 6, wherein at least one actuator for exciting a member and a support frame therefor are mounted on said shaking table.

9. A vibration testing system as set forth in claim 7, wherein at least one member exciting actuator and a support frame therefor are mounted on said shaking table.

10. A vibration testing apparatus as set forth in claim 1, further comprising:

a memory for storing calculation value data of the vibration response at a random position on the numerical model for every given period; and storing means for storing said data in said memory.

11. A vibration testing apparatus as set forth in claim 10, further comprising:

means for inputting the measured value of a sensor mounted on said member; and means for storing the measured value to said memory and for storing the measured value and data of the calculation value of the vibration response of said numerical model for every given period.

12. A vibration testing system as set forth in claim 11, wherein said arithmetic means includes a device for calculating the vibration response of said numerical model and for simultaneously outputting the calculated value at the random position to realize the calculated value of the vibration response at a boundary portion as the vibration response to the actuator.

13. A vibration testing system as set forth in claim 12, wherein said output of the vibration response is a voltage value.

14. A vibration testing system, comprising:

one or more actuators mounted at a boundary position between a member and a numerical model of a structure;

a controller for controlling said actuator;

a device for measuring a reaction value exerted to said actuator from said member;

a digital computer for storing data of said numerical model and for calculating a vibration response of said numerical model using the reaction measured by said device;

means for inputting the measured reaction value of the reaction to said digital computer;

means for outputting the calculated value of the vibration response calculated by said digital computer to said actuator as an excitation signal;

said digital computer inputting the measured value of the reaction generated on said actuator for every given period and providing the excitation signal corresponding to the vibration response at a time given after a predetermined period of said every given period at the boundary portion between the numerical model and the member based on the measured reaction value and a known external force value for making the vibration response of said actuator after the predetermined period consistent with the calculated value of the vibration response, to said controller for said actuator in parallel with calculation of the vibration response of said numerical model, in which the interval of calculation of said excitation signal for said actuator is equal to or slightly shorter than an interval of calculation of the vibration response.

15. A vibration testing method for a structure, said method comprising the steps of:

mounting one or more actuators having a reaction measuring device for measuring reaction exerted on said actuators from a member, at a boundary portion between the member and a numerical model connected to said structure;

measuring reaction at said boundary portion at the time of measurement of the reaction in said device;

inputting control signals corresponding to the measured value of said reaction measuring device by a digital computer which includes a first input means for inputting the measured value in said reaction measuring device and further input means for inputting a control signal to a controller for said actuator;

calculating a vibration response after a given period of time for measurement of the reaction at the border portion of the numerical model based on the measured value of the reaction and a known external force; and repeating to provide an excitation signal derived from the result of calculation of the vibration response, to the controller for said actuator to make the vibration response of the actuator after the given period consistent with the calculated value, with a given interval.

16. A method as set forth in claim 15, wherein the excitation signal is calculated in said digital computer with an interval derived by dividing an interval of calculation of the vibration response of the numerical model, into plural intervals, and control for the actuator is performed with the excitation signal.

17. A method as set forth in claim 16, wherein the vibration response to be realized by said actuator is any one of a displacement, a velocity and an acceleration or a combination thereof.

18. A vibration testing method for a structure, said method comprising the steps of:
   mounting one or more actuators having a reaction measuring device for measuring reaction exerted on said actuators from a member, at a boundary portion between the member and a numerical model connected to said structure;
   inputting control signals corresponding to the measured value of said reaction measuring device by a digital computer which includes a first input means for inputting the measured value in said reaction measuring device and further input means for inputting a control signal to a controller for said actuator;
   calculating a vibration response after a given period of time for measurement of the reaction at the border portion of the numerical model based on the measured value of the reaction and a known external force; and
   repeating to provide an excitation signal derived from the calculation result of the vibration response, to the controller for said actuator to make the vibration response of said actuator after the given period consistent with the calculated value, with a given interval,
   wherein the excitation signal is calculated in said digital computer with an interval derived by dividing an interval of calculation of the vibration response of the numerical model, into plural intervals, and control for said actuator is performed with the excitation signal,
   wherein the vibration response to be realized by said actuator is any one of a displacement, a velocity and an acceleration or a combination thereof,
   wherein said actuator is controlled by a displacement control, and the displacement of said actuator is controlled according to a function expressed by a sum of at least four mutually independent time functions during a period from a time at which a displacement and a speed as targets are derived to a time, at which the displacement and the speed are to be realized.

19. A vibration testing method for a structure, said method comprising the steps of:
   mounting one or more actuators having a reaction measuring device for measuring reaction exerted on said actuators from a member, at a boundary portion between the member and a numerical model connected to said structure;
   inputting control signals corresponding to the measured value of said reaction measuring device by a digital computer which includes a first input means for inputting the measured value in said reaction measuring device and further input means for inputting a control signal to a controller for said actuator;
   calculating a vibration response after a given period of time for measurement of the reaction at the border portion of the numerical model based on the measured value of the reaction and a known external force; and
   repeating to provide an excitation signal derived from the calculation result of the vibration response, to the controller for said actuator to make the vibration response of said actuator after the given period consistent with the calculated value, with a given interval,
   wherein the excitation signal is calculated in said digital computer with an interval derived by dividing an interval of calculation of the vibration response of the numerical model, into plural intervals, and control for said actuator is performed with the excitation signal,
   wherein the vibration response to be realized by said actuator is any one of a displacement, a velocity and an acceleration or a combination thereof,
   wherein said actuator is controlled by a displacement control, and the displacement is controlled by a displacement control, and the displacement of said actuator is controlled according to a function expressed by a sum of at least five mutually independent time functions during a period from a time, at which a displacement and an acceleration as targets are derived to a time, at which the displacement and the acceleration are to be realized.

20. A vibration testing method for a structure, said method comprising the steps of:
   mounting one or more actuators having a reaction measuring device for measuring reaction exerted on said actuators from a member, at a boundary portion between the member and a numerical model connected to said structure;
   inputting control signals corresponding to the measured value of said reaction measuring device by a digital computer which includes a first input means for inputting the measured value in said reaction measuring device and further input means for inputting a control signal to a controller for said actuator;
   calculating a vibration response after a given period of time for measurement of the reaction at the border portion of the numerical model based on the measured value of the reaction and a known external force; and
   repeating to provide an excitation signal derived from the calculation result of the vibration response, to the controller for said actuator to make the vibration response of said actuator after the given period consistent with the calculated value, with a given interval,
   wherein the excitation signal is calculated in said digital computer with an interval derived by dividing an interval of calculation of the vibration response of the numerical model, into plural intervals, and control for said actuator is performed with the excitation signal,
   wherein the vibration response to be realized by said actuator is any one of a displacement, a velocity and an acceleration or a combination thereof,
   wherein said actuator is controlled by a displacement control, and the displacement of said actuator is controlled according to a function expressed by a sum of at least six mutually independent time functions during a period from a, at which a displacement, a speed and an acceleration as targets are derived to a time, at which the displacement, the speed and the acceleration are to be realized.

21. A vibration testing method for a structure, said method comprising the steps of:

mounting one or more actuators having a reaction measuring device for measuring reaction exerted on said actuators from a member, at a boundary portion between the member and a numerical model connected to said structure;

inputting control signals corresponding to the measured value of said reaction measuring device by a digital computer which includes a first input means for inputting the measured value in said reaction measuring device and further input means for inputting a control signal to a controller for said actuator;

calculating a vibration response after a given period of time for measurement of the reaction at the border portion of the numerical model based on the measured value of the reaction and a known external force; and repeating to provide an excitation signal derived from the calculation result of the vibration response, to the controller for said actuator to make the vibration response of said actuator after the given period consistent with the calculated value, with a given interval, wherein the excitation signal is calculated in said digital computer with an interval derived by dividing an interval of calculation of the vibration response of the numerical model, into plural intervals, and control for said actuator is performed with the excitation signal, wherein the vibration response to be realized by said actuator is any one of a displacement, a velocity and an acceleration or a combination thereof, wherein said actuator is controlled by a displacement control, and the displacement of said actuator is controlled according to a function expressed by a cubic function of a time during a period from a time, at which a displacement and a speed as targets are derived to a time, at which the displacement and the speed are to be realized.

22. A vibration testing method for a structure, said method comprising the steps of:

mounting one or more actuators having a reaction measuring device for measuring reaction exerted on said actuators from a member, at a boundary portion between the member and a numerical model connected to said structure;

inputting control signals corresponding to the measured value of said reaction measuring device by a digital computer which includes a first input means for inputting the measured value in said reaction measuring device and further input means for inputting a control signal to a controller for said actuator;

calculating a vibration response after a given period of time for measurement of the reaction at the border portion of the numerical model based on the measured value of the reaction and a known external force; and repeating to provide an excitation signal derived from the calculation result of the vibration response, to the controller for said actuator to make the vibration response of said actuator after the given period consistent with the calculated value, with a given interval, wherein the excitation signal is calculated in said digital computer with an interval derived by dividing an interval of calculation of the vibration response of the numerical model, into plural intervals, and control for said actuator is performed with the excitation signal, wherein the vibration response to be realized by said actuator is any one of a displacement, a velocity and an acceleration or a combination thereof, wherein said actuator is controlled by a displacement control, and the displacement of said actuator is controlled according to a function expressed by a biquadratic function of time during a period from a time, at which a displacement and an acceleration as targets are derived to a time at which the displacement and the acceleration are to be realized.

23. A vibration testing method for a structure, said method comprising the steps of:

mounting one or more actuators having a reaction measuring device for measuring reaction exerted on said actuators from a member, at a boundary portion between the member and a numerical model connected to said structure;

inputting control signals corresponding to the measured value of said reaction measuring device by a digital computer which includes a first input means for inputting the measured value in said reaction measuring device and further input means for inputting a control signal to a controller for said actuator;

calculating a vibration response after a given period of time for measurement of the reaction at the border portion of the numerical model based on the measured value of the reaction and a known external force; and repeating to provide an excitation signal derived from the calculation result of the vibration response, to the controller for said actuator to make the vibration response of said actuator after the given period consistent with the calculated value, with a given interval, wherein the excitation signal is calculated in said digital computer with an interval derived by dividing an interval of calculation of the vibration response of the numerical model, into plural intervals, and control for said actuator is performed with the excitation signal, wherein the vibration response to be realized by said actuator is any one of a displacement, a velocity and an acceleration or a combination thereof, wherein said actuator is controlled by a displacement control, and the displacement of said actuator is controlled according to a function expressed by a quintuple function of time during a period from a time, at which a displacement, a velocity and an acceleration as targets are derived to a time at which the displacement, the speed and the acceleration are to be realized.

24. A vibration testing method for a structure, said method comprising the steps of:

mounting one or more actuators having a reaction measuring device for measuring reaction exerted on said actuators from a member, at a boundary portion between the member and a numerical model connected to said structure;

inputting control signals corresponding to the measured value of said reaction measuring device by a digital computer which includes a first input means for inputting the measured value in said reaction measuring device and further input means for inputting a control signal to a controller for said actuator;

calculating a vibration response after a given period of time for measurement of the reaction at the border portion of the numerical model based on the measured value of the reaction and a known external force;

repeating to provide an excitation signal derived from the calculation result of the vibration response, to the controller for said actuator to make the vibration response of said actuator after the given period consistent with the calculated value, with a given interval;

wherein the excitation signal is calculated in said digital computer with an interval derived by dividing an interval of calculation of the vibration response of the numerical model, into plural intervals, and control for said actuator is performed with the excitation signal, wherein the vibration response to be realized by said actuator is any one of a displacement, a velocity and an acceleration or a combination thereof;

inputting a measured value of the displacement of said actuator at a time to realize the calculated value of the vibration response of the digital computer, using the displacement measuring device of said actuator and the first input means of inputting the measured value of said measuring device;

evaluating an error of the actual displacement relative to the calculated value; and providing the excitation signal to the controller for said actuator so as to compensate said error after the given period.

25. A vibration testing method for a structure, said method comprising the steps of:

mounting one or more actuators having a reaction measuring device for measuring reaction exerted on said actuators from a member, at a boundary portion between the member and a numerical model connected to said structure;

inputting control signals corresponding to the measured value of said reaction measuring device by a digital computer which includes a first input means for inputting the measured value in said reaction measuring device and further input means for inputting a control signal to a controller for said actuator;

calculating a vibration response after a given period of time for measurement of the reaction at the border portion of the numerical model based on the measured value of the reaction and a known external force;

repeating to provide an excitation signal derived from the calculation result of the vibration response, to the controller for said actuator to make the vibration response of said actuator after the given period consistent with the calculated value, with a given interval, wherein the excitation signal is calculated in said digital computer with an interval derived by dividing an interval of calculation of the vibration response of the numerical model, into plural intervals, and control for said actuator is performed with the excitation signal, wherein the vibration response to be realized by said actuator is any one of a displacement, a velocity and an acceleration or a combination thereof, wherein a displacement of said actuator during a period from a time, at which a displacement and an acceleration as targets are derived to a time, at which the displacement and the acceleration are to be realized is expressed by at least a quintuple function;

displacement controlling said actuator;

inputting a measured value of the displacement of said actuator at a time to realize the calculated value of the vibration response of the digital computer, using the displacement measuring device of said actuator and the input means of said digital computer for inputting the measured value of said measuring device;

evaluating an error of the actual displacement relative to the calculated value; and providing the excitation signal to the controller for said actuator so as to compensate said error after the given period.

26. A method as set forth in claim 17, wherein the vibration response of said numerical model is calculated by said digital computer and the calculated value of the vibration response at random position of the numerical model is stored in a memory of said digital computer with a given interval.

27. A method as set forth in claim 26, wherein a measured value of a sensor mounted on the member is input to said digital computer, and the measured value and the calculated value of the vibration response of the numerical model are stored in the memory of the digital computer with the given interval.

28. A vibration response analyzing system for a structure, comprising:

a digital computer;

means, including a data input and output device connected to said digital computer, for exciting a member of a structure by means of an actuator via said data input and output device with a predetermined interval of analysis so that an analytic value of time hysteric vibration response at a boundary between a numerical model and a member is achieved for performing vibration response time hysteric analysis with the predetermined interval with respect to the member and the numerical model of the structure;

reaction measuring means for measuring reaction from said member; and means for deriving vibration response of the overall structure by coupling vibration response time hysteric analysis of said numerical model and said member on said digital computer.

* * * * *